US012562997B2

(12) United States Patent
Busche

(10) Patent No.: US 12,562,997 B2
(45) Date of Patent: Feb. 24, 2026

(54) INTELLIGENT QUEUING WITH FEEDBACK-DRIVEN ADMISSION CONTROLS

(71) Applicant: CenturyLink Intellectual Property LLC, Broomfield, CO (US)

(72) Inventor: Matthew Busche, Lakewood, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 187 days.

(21) Appl. No.: 18/497,678

(22) Filed: Oct. 30, 2023

(65) Prior Publication Data

US 2024/0205162 A1     Jun. 20, 2024

Related U.S. Application Data

(60) Provisional application No. 63/432,917, filed on Dec. 15, 2022.

(51) Int. Cl.
*H04L 47/625*     (2022.01)
*H04L 47/6275*     (2022.01)
*H04L 47/70*     (2022.01)

(52) U.S. Cl.
CPC ...... *H04L 47/6255* (2013.01); *H04L 47/6275* (2013.01); *H04L 47/82* (2013.01)

(58) Field of Classification Search
CPC .. H04L 47/6255; H04L 47/6275; H04L 47/82
See application file for complete search history.

(56) References Cited

U.S. PATENT DOCUMENTS

| | | | | |
|---|---|---|---|---|
| 6,421,676 | B1 * | 7/2002 | Krishnamurthy ... | G06F 16/2471 707/999.102 |
| 6,430,616 | B1 * | 8/2002 | Brinnand ................ | H04L 43/00 709/224 |
| 2002/0183083 | A1 * | 12/2002 | Nagira .................. | H04W 92/02 455/503 |
| 2004/0248596 | A1 * | 12/2004 | Panchal .................. | H04W 4/06 455/414.1 |
| 2006/0294058 | A1 * | 12/2006 | Zabback ............. | G06F 16/2462 |
| 2007/0201364 | A1 * | 8/2007 | Nakajima ............. | H04W 28/06 370/230 |

(Continued)

FOREIGN PATENT DOCUMENTS

KR     20020002305 A  *  1/2002  ........... H04L 1/1874

*Primary Examiner* — Oanh Duong

(57) ABSTRACT

Novel tools and techniques are provided for implementing intelligent queuing with feedback-driven admission controls. In various embodiments, a computing system may send, to a downstream system, first data among a plurality of data that is stored in a queue; may determine whether or not the first data has been successfully transmitted to and received by the downstream system; based on a determination that the first data has not been successfully received by the downstream system and when the first queue is in a first state, may analyze a number of successful transmission attempts and a number of unsuccessful transmission attempts within a first predetermined window, to determine whether a first trigger event has occurred; and if so, may change a state of the queue from the first state to a second state, the first and second states of the queue defining how data is enqueued by the queue.

20 Claims, 12 Drawing Sheets

100

(56) References Cited

U.S. PATENT DOCUMENTS

| | | | |
|---|---|---|---|
| 2015/0304227 A1* | 10/2015 | Yang ................... | H04L 47/6255 |
| | | | 709/232 |
| 2016/0182388 A1* | 6/2016 | Tsuruoka ............. | H04L 47/283 |
| | | | 370/315 |
| 2018/0278497 A1* | 9/2018 | Hung .................. | H04L 43/0876 |
| 2020/0186470 A1* | 6/2020 | Yamamoto ............. | H04L 49/90 |
| 2020/0228932 A1* | 7/2020 | Ernst .................... | H04L 63/101 |
| 2021/0133761 A1* | 5/2021 | Cartwright ............. | H04L 41/16 |
| 2021/0303573 A1* | 9/2021 | Arnold ............. | G06F 16/24553 |
| 2021/0359931 A1* | 11/2021 | Wang ..................... | H04L 47/56 |
| 2022/0116994 A1* | 4/2022 | Chen ................ | H04W 74/0808 |
| 2022/0206847 A1* | 6/2022 | Mosto .................. | G06F 9/4881 |

* cited by examiner

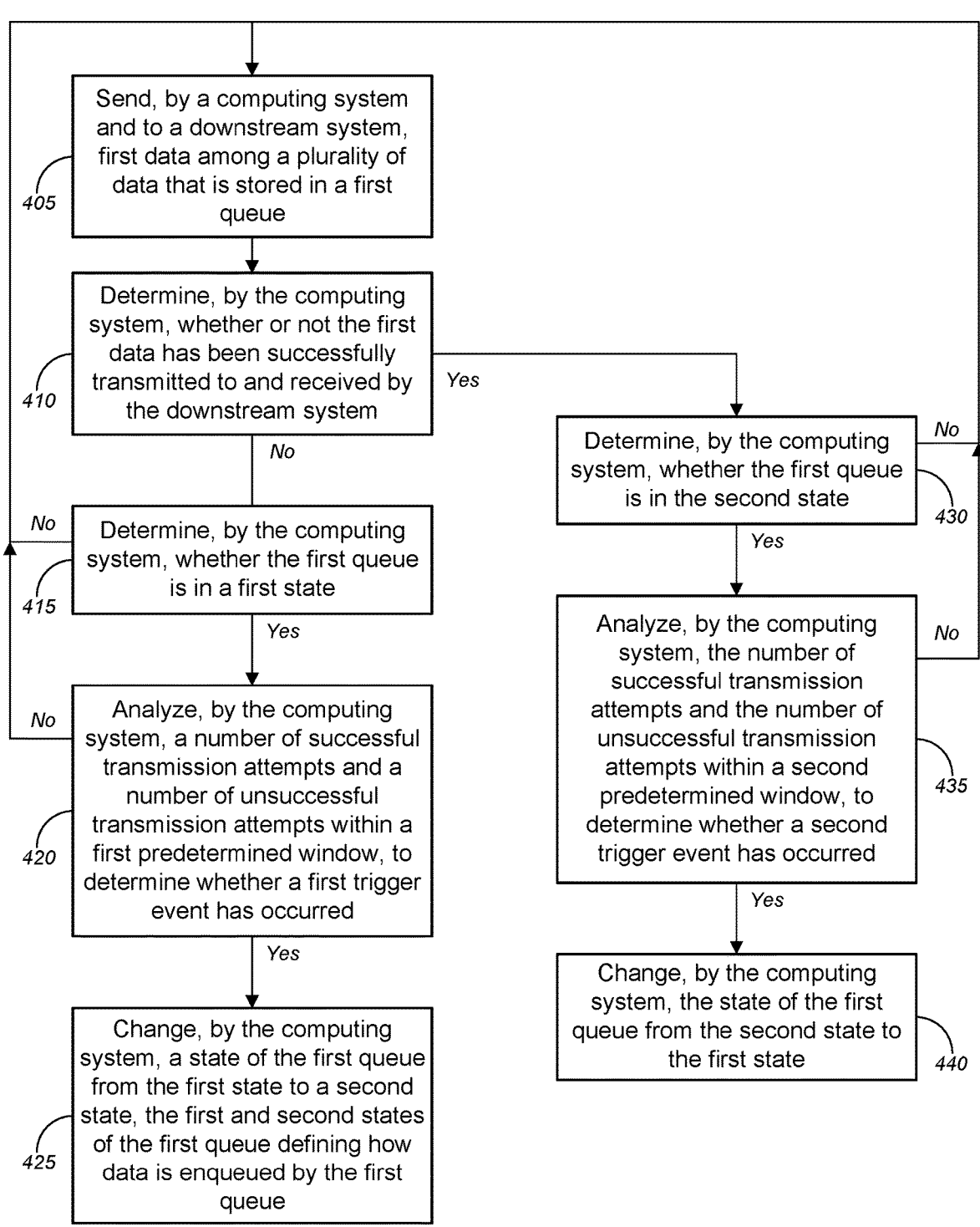
Fig. 4A                                                    400

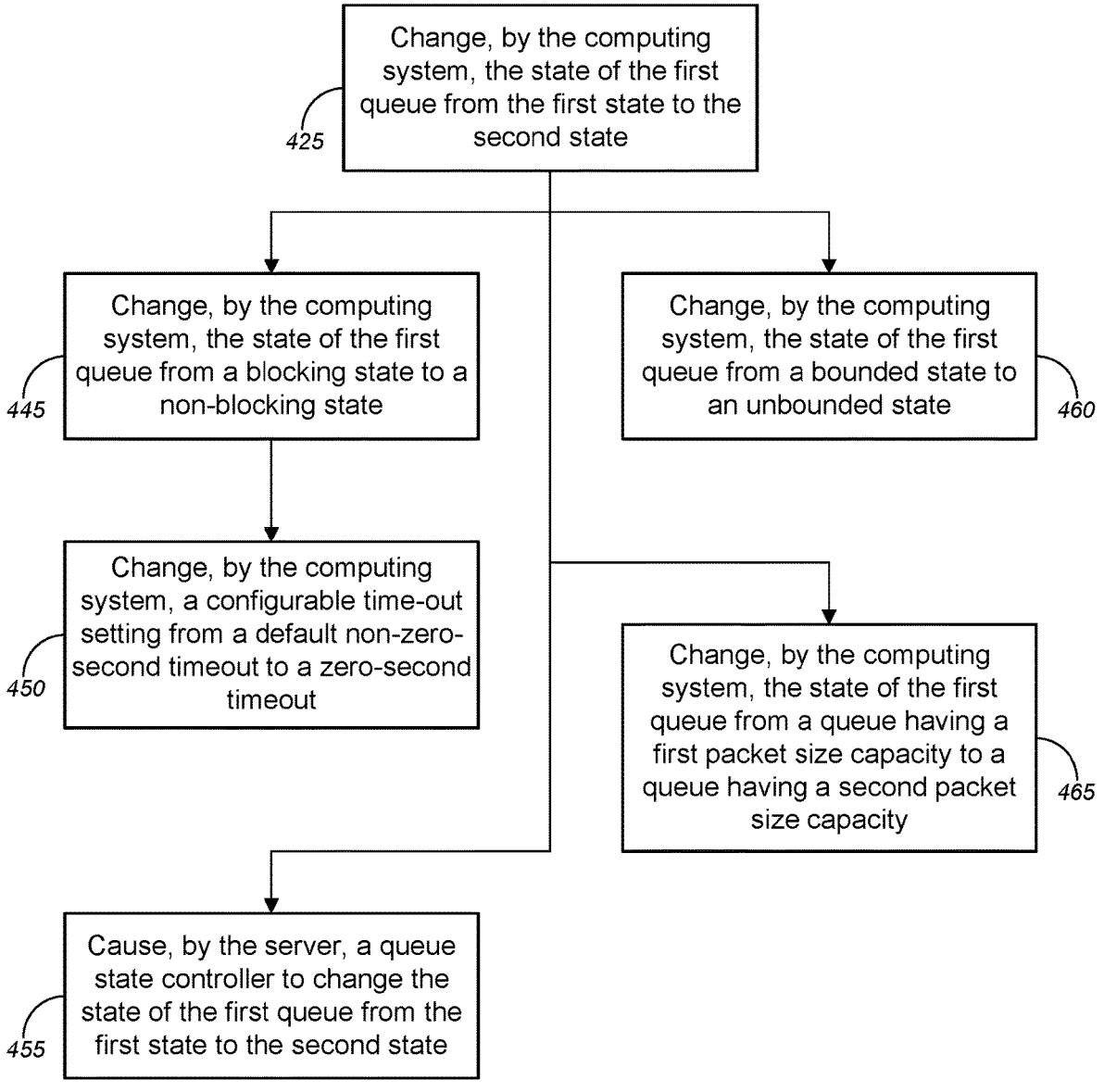

425  Change, by the computing system, the state of the first queue from the first state to the second state 445  Change, by the computing system, the state of the first queue from a blocking state to a non-blocking state 460  Change, by the computing system, the state of the first queue from a bounded state to an unbounded state 450  Change, by the computing system, a configurable time-out setting from a default non-zero-second timeout to a zero-second timeout 465  Change, by the computing system, the state of the first queue from a queue having a first packet size capacity to a queue having a second packet size capacity 455  Cause, by the server, a queue state controller to change the state of the first queue from the first state to the second state Fig. 4B                                                  400

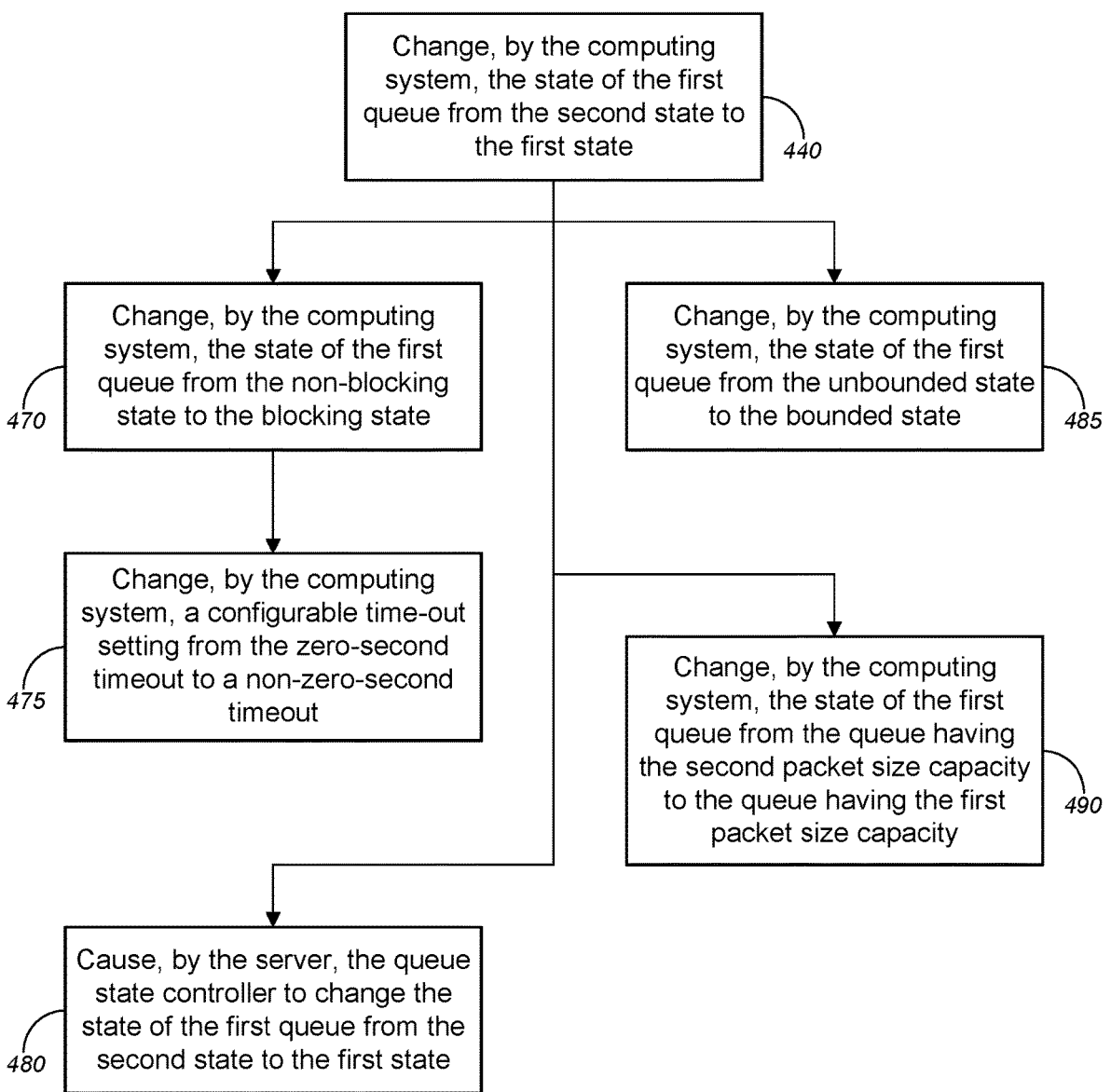
Fig. 4C                                              400

400

500

INTELLIGENT QUEUING WITH FEEDBACK-DRIVEN ADMISSION CONTROLS

CROSS REFERENCE TO RELATED APPLICATIONS

This application claims the benefit of U.S. Provisional Application No. 63/432,917 filed Dec. 15, 2022, entitled Intelligent Queuing with Feedback-Driven Admission Controls," which is incorporated herein by reference in its entirety.

COPYRIGHT STATEMENT

FIELD

The present disclosure relates, in general, to methods, systems, and apparatuses for implementing data queuing, and, more particularly, to methods, systems, and apparatuses for implementing intelligent queuing with feedback-driven admission controls.

BACKGROUND

In conventional queuing systems, such as queuing systems for system logging implementation or the like, the queues may be fixed in a blocking state or in a non-blocking state. In the case that a queue in a blocking state is full, new data is blocked from enqueue in the queue and forced to wait until there is space in the queue. This, however, may take time (e.g., >1 s, or the like), which causes applications sending data to the blocking queue to wait. In some cases, data or messages stored on the queue may start to degrade over time or may cease to be relevant over time. In a non-blocking state, applications are not forced to wait, so if the queue cannot accept new data, the new data is dropped or lost, and an error message is immediately sent to the application thread attempting to write to the queue.

It is with respect to this general technical environment to which aspects of the present disclosure are directed.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n," where n denotes any suitable integer number, and may be either the same or different from the suffix "n" for other components in the same or different figures. For example, for component #1 $105a$-$105n$, the integer value of n in $105n$ may be the same or different from the integer value of n in $110n$ for component #2 $110a$-$110n$, and so on.

FIGS. 4A-4D are flow diagrams illustrating a method for implementing intelligent queuing with feedback-driven admission controls, in accordance with various embodiments.

DETAILED DESCRIPTION OF CERTAIN EMBODIMENTS

Overview

Figure 1:
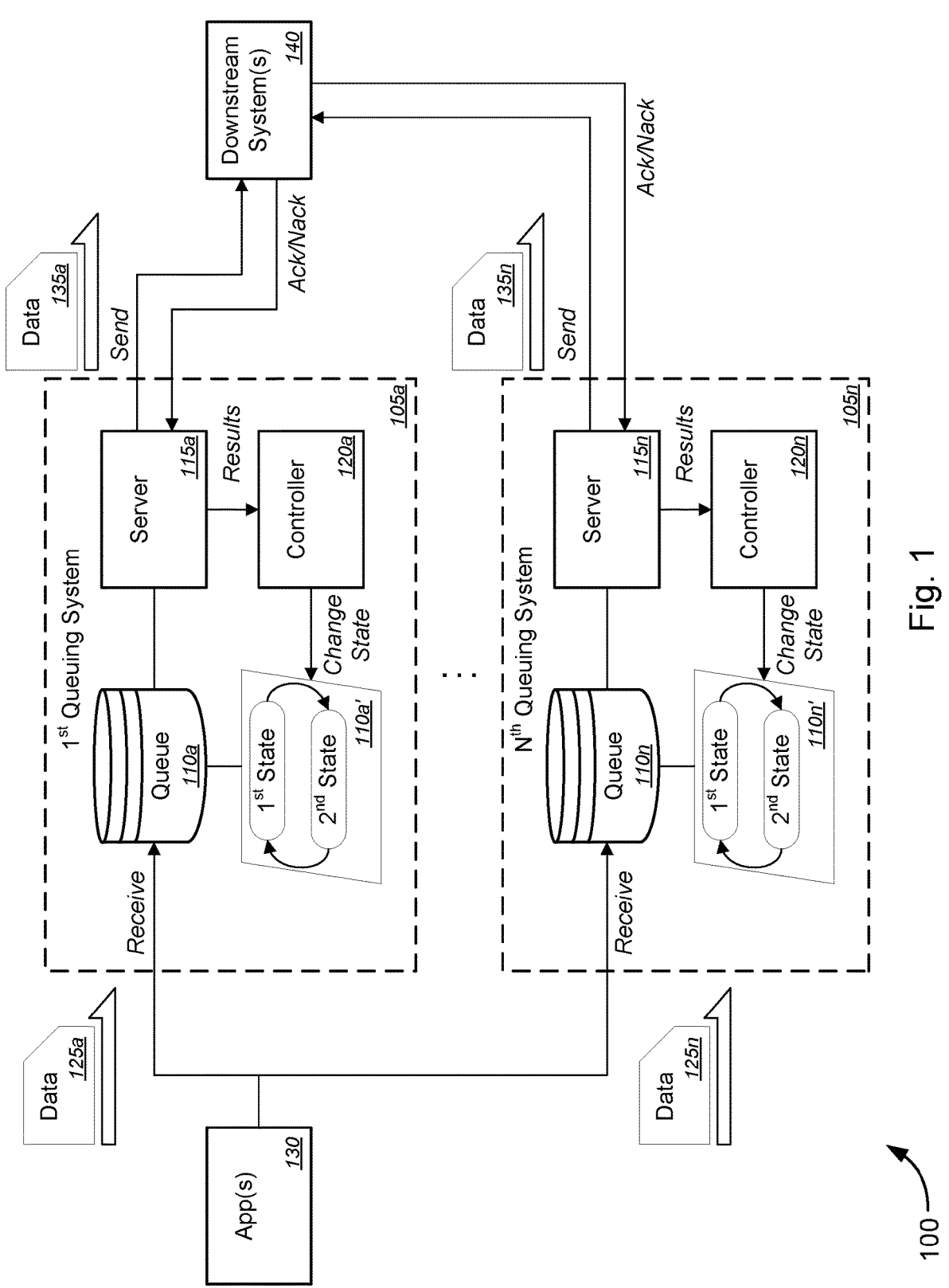
FIG. 1 is a schematic diagram illustrating a system for implementing intelligent queuing with feedback-driven admission controls, in accordance with various embodiments.

Various embodiments provide tools and techniques for implementing data queuing, and, more particularly, to methods, systems, and apparatuses for implementing intelligent queuing with feedback-driven admission controls.

In various embodiments, a computing system may send, to a downstream system, first data among a plurality of data that is stored in a first queue; may determine whether or not the first data has been successfully transmitted to and received by the downstream system; based on a determination that the first data has not been successfully received by the downstream system and when the first queue is in a first state, may analyze a number of successful transmission attempts and a number of unsuccessful transmission attempts within a first predetermined window, to determine whether a first trigger event has occurred [also referred to herein as "failure condition" ]; and based on a determination that the first trigger event has occurred, may change a state of the first queue from the first state to a second state, the first and second states of the first queue defining how data is enqueued by the first queue.

In some embodiments, determining that the first trigger event has occurred based on the analysis may comprise at least one of: determining that the first trigger event has occurred based on a determination that a number of times that data has not been successfully received by the downstream system exceeds a first threshold number (e.g., 1, 2, 3, 4, 5, 6, 7, 8, 9, or 10, or the like, or a threshold number within a range between 1 and 10, or between 1 and 3, or between 1 and 5, or the like) within the first predetermined window, wherein the first predetermined window may comprise one of a sliding window having a first predetermined time duration or a sliding window having a first predetermined number of attempts; or determining that the first trigger event has occurred based on a determination that a number of consecutive unsuccessful transmission attempts equaling the first threshold number has occurred; and/or the like.

Herein, the unsuccessful transmission attempts or the failure conditions either may include retry attempts (e.g., where each retry attempt is counted toward the number of times that data has not been successfully received by the downstream system, etc.) or may exclude retry attempts (e.g., where all retry attempts and the initial attempt for any particular data being transmitted to the downstream system is counted as a single attempt when counting toward the number of times that data has not been successfully received by the downstream system, etc.).

In some cases, each successful transmission attempt and each unsuccessful transmission attempt from within both the first predetermined window and a historical set of recorded attempts may be fed into an exponential decay filter having a configurable decay rate that defines a recent time-scale to produce a number that is an estimate of a success rate of a transmission channel; when the estimate of the success rate falls below a first predetermined value, causing the state of the first queue to change from the first state to the second state; and when the estimate of the success rate rises above a second predetermined value that is greater than the first predetermined value, causing the state of the first queue to change from the second state to the first state.

According to some embodiments, based on a determination that the first data has been successfully received by the downstream system and when the first queue is in the second state, the computing system may analyze the number of successful transmission attempts and the number of unsuccessful transmission attempts within a second predetermined window, to determine whether a second trigger event has occurred [also referred to herein as "success condition"]; and based on a determination that the second trigger event has occurred, the computing system may change the state of the first queue from the second state to the first state.

In some embodiments, determining that the second trigger event has occurred based on the analysis may comprise at least one of: determining that the second trigger event has occurred based on a determination that a number of times that data has been successfully received by the downstream system exceeds a second threshold number (e.g., 10, 20, 25, 30, 40, 50, 75, 100, 150, 200, or 250, or the like, or a threshold number within a range between 10 and 250, or between 50 and 200, or between 100, and 200, or the like) within the second predetermined window, wherein the second predetermined window may comprise one of a sliding window having a second predetermined time duration or a sliding window having a second predetermined number of attempts; determining that the second trigger event has occurred based on a determination that a number of consecutive successful transmission attempts equaling the second threshold number has occurred; or determining that a period since the first trigger event occurred exceeds a third predetermined time duration.

In some aspects, a server may send, to a downstream system, first data among a plurality of data that is stored in a first queue among a plurality of queues that is part of a logging system having a plurality of working threads. In such cases, the plurality of data may include a plurality of low priority data. The server may determine whether or not the first data has been successfully transmitted to and received by the downstream system. Based on a determination that the first data has not been successfully received by the downstream system and when the first queue is in a blocking state, the server may analyze a number of successful transmission attempts and a number of unsuccessful transmission attempts within a first predetermined window, to determine whether a first trigger event has occurred (i.e., the failure condition, or the like). Based on a determination that the first trigger event has occurred, the server may change a state of the first queue from the blocking state to a non-blocking state. In some cases, when the first queue is full and in the blocking state, the blocking state may cause second data that is subsequently received by the first queue to wait to enqueue in the first queue until the first queue is no longer full and is able to enqueue the second data. When the first queue is full and in the non-blocking state, the non-blocking state may cause third data that is subsequently received by the first queue to fail to enqueue, resulting in the third data being dropped and a first queue error message being immediately sent to at least a source of the third data. Based on a determination that the first data has been successfully received by the downstream system and when the first queue is in the non-blocking state, the server may analyze the number of successful transmission attempts and the number of unsuccessful transmission attempts within a second predetermined window, to determine whether a second trigger event has occurred (i.e., the success condition, or the like). Based on a determination that the second trigger event has occurred, the server may change the state of the first queue from the non-blocking state to the blocking state.

In this manner, the queuing system is not held to waiting. Failure conditions at the downstream system may result in immediate notification being sent to the source of the data being sent to the queue. Actions or tasks may then be initiated by the source of the data.

These and other aspects of the intelligent queuing with feedback-driven admission controls is described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method may comprise sending, by a computing system and to a downstream system, first data among a plurality of data that is stored in a first queue; determining, by the computing system, whether or not the first data has been successfully transmitted to and received by the downstream system; based on a determination that the first data has not been successfully received by the downstream system and when the first queue is in a first state, analyzing, by the computing system, a number of successful transmission attempts and a number of unsuccessful transmission attempts within a first predetermined window, to determine whether a first trigger event has occurred; and based on a determination that the first trigger event has occurred, changing, by the computing system, a state of the first queue from the first state to a second state, the first and second states of the first queue defining how data is enqueued by the first queue.

In some embodiments, the computing system may comprise at least one of a queuing system, a queue state controller, a server, a cloud computing system, or a distributed computing system, and/or the like. Alternatively, or additionally, in some cases, the computing system may comprise one of a computing system of a network performance measurement system, a computing system of a system log ("syslog") message logging system, a computing system of a fault management system, or a computing system of a content delivery network ("CDN"), and/or the like.

In some examples, determining that the first trigger event has occurred based on the analysis may comprise at least one of: determining that the first trigger event has occurred based on a determination that a number of times that data has not been successfully received by the downstream system exceeds a first threshold number within the first predetermined window, wherein the first predetermined window may comprise one of a sliding window having a first predetermined time duration or a sliding window having a first predetermined number of attempts; or determining that the first trigger event has occurred based on a determination that a number of consecutive unsuccessful transmission attempts equaling the first threshold number has occurred; and/or the like. In some cases, each successful transmission attempt and each unsuccessful transmission attempt from within both the first predetermined window and a historical set of recorded attempts may be fed into an exponential decay filter having a configurable decay rate that defines a recent time-scale to produce a number that is an estimate of a success rate of a transmission channel. When the estimate of the success rate falls below a first predetermined value, the computing system may cause the state of the first queue to change from the first state to the second state. When the estimate of the success rate rises above a second predetermined value that is greater than the first predetermined value, the computing system may cause the state of the first queue to change from the second state to the first state. In some embodiments, an exponential decay filter may have a single (e.g., floating point) number as a state variable that ranges from 0.0 to 1.0 (which may be referred to herein as "the success rate" represented by variable S, or the like). A success rate of 0.0 means no transmissions are getting through, 1.0 means all transmissions are getting through, and 0.9 means about 90% of the transmissions are getting through. In addition to this state variable, the exponential decay filter may have a configured (and fixed) decay rate R, which can range from 0.0 to 1.0. A small number (i.e., a small decay rate) may cause the success rate to change only slowly in response to success or failure events, whilst a larger number may cause the success rate to move quickly. Each transmission event may be represented by a number E, which may have a value "1" for successful transmissions and a value "0" for failures or failed transmissions. The exponential decay filter may be updated by feeding each success-or-failure event E (sequentially) into an update function, such as:

$$S_{n+1} = E_n R + (1 - R)S_n. \qquad \text{(Eqn. 1)}$$

For example, if Sn=0.9 (meaning that about 90% of recent attempts have succeeded), R=0.1 (e.g., 10% decay rate), and E=1 (i.e., a successful transmission), then the following would be the updated state:

$$S_{n+1} = 1(0.1) + (1 - 0.1)0.9 = 0.1 + 0.81 = 0.91. \qquad \text{(Eqn. 2)}$$

In this case, the single successful event increased the success rate by 0.01 (from 0.9 to 0.91). If $S_n$=0.5, that same success would have increased the success rate to 0.55. A success improves the average more for previously low average values. In other words, if the success rate falls below a first critical number (in this case, the first predetermined value), the queue is changed into the second state (e.g., a non-blocking state or an unbounded state, or the like). Similarly, if the success rate rises above a second critical number (in this case, the second predetermined value), which must not be less than the first critical number, the queue is changed back into the first state (e.g., a blocking state or a bounded state, or the like).

According to some embodiments, the method may further comprise, based on a determination that the first data has been successfully received by the downstream system and when the first queue is in the second state, analyzing, by the computing system, the number of successful transmission attempts and the number of unsuccessful transmission attempts within a second predetermined window, to determine whether a second trigger event has occurred; and based on a determination that the second trigger event has occurred, changing, by the computing system, the state of the first queue from the second state to the first state.

In some cases, determining that the second trigger event has occurred based on the analysis may comprise at least one of: determining that the second trigger event has occurred based on a determination that a number of times that data has been successfully received by the downstream system exceeds a second threshold number within the second predetermined window, wherein the second predetermined window may comprise one of a sliding window having a second predetermined time duration or a sliding window having a second predetermined number of attempts; determining that the second trigger event has occurred based on a determination that a number of consecutive successful transmission attempts equaling the second threshold number has occurred; or determining that a period since the first trigger event occurred exceeds a third predetermined time duration; and/or the like.

In some instances, changing the state of the first queue from the first state to the second state may comprise changing, by the computing system, the state of the first queue from a blocking state to a non-blocking state. In some cases, when the first queue is full and in the blocking state, the blocking state may cause second data that is subsequently received by the first queue to wait to enqueue in the first queue until the first queue is no longer full and is able to enqueue the second data. In some cases, when the first queue is full and in the non-blocking state, the non-blocking state may cause third data that is subsequently received by the first queue to fail to enqueue, resulting in the third data being dropped and a first queue error message being immediately sent to at least a source of the third data. In some instances, changing the state of the first queue from the blocking state to the non-blocking state may comprise changing, by the computing system, a configurable time-out setting from a default non-zero-second timeout to a zero-second timeout.

In some cases, changing the state of the first queue from the second state to the first state may comprise changing, by the computing system, the state of the first queue from the non-blocking state to the blocking state. In some instances, changing the state of the first queue from the non-blocking state to the blocking state may comprise changing, by the computing system, a configurable time-out setting from a zero-second timeout to a non-zero-second timeout.

In some embodiments, the computing system may comprise a server. In such cases, changing the state of the first queue from the first state to the second state may comprise causing, by the server, a queue state controller to change the state of the first queue from the first state to the second state. In some cases, changing the state of the first queue from the second state to the first state may comprise causing, by the server, the queue state controller to change the state of the first queue from the second state to the first state.

According to some embodiments, changing the state of the first queue from the first state to the second state may comprise changing, by the computing system, the state of the first queue from a bounded state to an unbounded state. In some cases, the bounded state may be a set capacity state and, when the first queue is full and in the bounded state, the bounded state may cause the first queue to prevent fourth data that is subsequently received by the first queue from enqueuing in the first queue until the first queue is no longer full and is able to enqueue the fourth data. In some instances, the unbounded state may be a state that allows the first queue to expand in capacity and, when the first queue is full and in the unbounded state, the unbounded state may cause the first queue to expand in capacity to enqueue fifth data that is subsequently received by the first queue.

In some cases, the plurality of data that is stored in the first queue may be stored as a plurality of data packets. In such cases, changing the state of the first queue from the first state to the second state may comprise changing, by the computing system, the state of the first queue from a queue having a first packet size capacity to a queue having a second packet size capacity. In some instances, the second packet size capacity may dynamically change based on at least one of how many data packets have been successfully received by the downstream system, how many data packets have not been successfully received by the downstream system, which data packets have been successfully received by the downstream system, or which data packets have not been successfully received by the downstream system, and/or the like.

In some embodiments, determining whether or not the first data has been successfully transmitted to and received by the downstream system may comprise one of: receiving, by the computing system, an acknowledgment ("Ack") message from the downstream system indicating that the first data has been successfully received by the downstream system; receiving, by the computing system, a negative acknowledgment ("Nack" or "Nak") message from the downstream system indicating that the first data has not been successfully received by the downstream system; receiving, by the computing system, an error message from the downstream system indicating that the first data has not been successfully received by the downstream system; or determining, by the computing system, that none of an Ack message, a Nack message, or an error message have been received from the downstream system for a period exceeding a predetermined timeout period since the first data was sent from the computing system to the downstream system; and/or the like.

According to some embodiments, the first queue may be among a plurality of queues that is part of a logging system having a plurality of working threads. In some cases, the plurality of data may comprise a plurality of low priority data.

In another aspect, a system may comprise a computing system, which may comprise at least one first processor and a first non-transitory computer readable medium communicatively coupled to the at least one first processor. The first non-transitory computer readable medium may have stored thereon computer software comprising a first set of instructions that, when executed by the at least one first processor, causes the computing system to: send, to a downstream system, first data among a plurality of data that is stored in a first queue; determine whether or not the first data has been successfully transmitted to and received by the downstream system; based on a determination that the first data has not been successfully received by the downstream system and when the first queue is in a first state, analyzing, by the computing system, a number of successful transmission attempts and a number of unsuccessful transmission attempts within a first predetermined window, to determine whether a first trigger event has occurred; and based on a determination that the first trigger event has occurred, change a state of the first queue from the first state to a second state, the first and second states of the first queue defining how data is enqueued by the first queue.

In some embodiments, the computing system may comprise at least one of a queuing system, a queue state controller, a server, a cloud computing system, or a distributed computing system, and/or the like.

In yet another aspect, a method may comprise sending, by a server and to a downstream system, first data among a plurality of data that is stored in a first queue among a plurality of queues that is part of a logging system having a plurality of working threads, wherein the plurality of data may comprise a plurality of low priority data; determining, by the server, whether or not the first data has been successfully transmitted to and received by the downstream system; based on a determination that the first data has not been successfully received by the downstream system and when the first queue is in a blocking state, analyzing, by the computing system, a number of successful transmission attempts and a number of unsuccessful transmission attempts within a first predetermined window, to determine whether a first trigger event has occurred; based on a determination that the first trigger event has occurred, changing, by the server, a state of the first queue from the blocking state to a non-blocking state, wherein, when the first queue is full and in the blocking state, the blocking state may cause second data that is subsequently received by the first queue to wait to enqueue in the first queue until the first queue is no longer full and is able to enqueue the second data, wherein, when the first queue is full and in the non-blocking state, the non-blocking state may cause third data that is subsequently received by the first queue to fail to enqueue, resulting in the third data being dropped and a first queue error message being immediately sent to at least a source of the third data; based on a determination that the first data has been successfully received by the downstream system and when the first queue is in the non-blocking state, analyzing, by the computing system, the number of successful transmission attempts and the number of unsuccessful transmission attempts within a second predetermined window, to determine whether a second trigger event has occurred; and based on a determination that the second trigger event has occurred, changing, by the server, the state of the first queue from the non-blocking state to the blocking state.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

SPECIFIC EXEMPLARY EMBODIMENTS

We now turn to the embodiments as illustrated by the drawings. FIGS. 1-5 illustrate some of the features of the method, system, and apparatus for implementing data queuing, and, more particularly, to methods, systems, and apparatuses for implementing intelligent queuing with feedback-driven admission controls, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 is a schematic diagram illustrating a system 100 for implementing intelligent queuing with feedback-driven admission controls, in accordance with various embodiments.

In the non-limiting embodiment of FIG. 1, system 100 may include, without limitation, at least one of one or more queuing systems 105a-105n (collectively, "queuing systems 105" or the like), one or more queues 110a-110n (collectively, "queues 110" or the like), one or more servers 115a-115n (collectively, "servers 115" or the like), one or more controllers 120a-120n (collectively, "controllers 120" or the like), at least one application 130 (e.g., at least one software application ("app"), at least one device each running the application or app, or the like), or at least one downstream system 140, and/or the like.

In some embodiments, each queuing system 105 may include, but is not limited to, a queue 110 that stores, or is configured to store, data 125 received by the queuing system 105; a server 115 that retrieves, or is configured to retrieve, data 135 stored in queue 110, that sends, or is configured to send, to one or more of the at least one downstream system 140, and that sends, or is configured to send, results (e.g., success or failure) of transmission of data 135 to the one or more of the at least one downstream system 140; a controller 120 that causes, or is configured to cause, the queue 110 to change state 110' between a first state and a second state based at least in part on the results received from the server 115, the first and second states 110' of the queue 110 defining how data is enqueued by the queue 110.

For example, as shown in FIG. 1, the first queuing system 105a may include, but is not limited to, first queue 110a, first server 115a, and first controller 120a, where data 125a is received and stored by the first queue 110a from the at least one application 130, data 135a is sent by the first server 115a to one or more of the at least one downstream system 140, a response (or lack of response) is received by the first server 115a from the one or more of the at least one downstream system 140 and is relayed as results to the first controller 120a, and the state 110a' of the first queue 110a is caused by the first controller 120a to change from the first state to the second state, or vice versa, based on the received results. In some instances, the response (or lack of response) received by the first server 115a from the one or more of the at least one downstream system 140 may include, but is not limited to, at least one of an acknowledgment ("Ack") message indicating that the data 135a has been successfully received by the downstream system 140, a negative acknowledgment ("Nack" or "Nak") message indicating that the data 135a has not been successfully received by the downstream system 140; an error message indicating that the data 135a has not been successfully received by the downstream system 140; or a lack of response (e.g., Ack message, Nack message, or error message, etc.) from the at least one downstream system 140 for a period exceeding a predetermined timeout period (e.g., 25, 50, 75, 100, 200, 300, 400, 500, 1000 ms or longer, or a timeout period within a range between 1 ms and 1 s, or between 100 ms and 1 s, or between 500 ms and 1 s, or greater than 1 s, or the like) since data 135a was sent from the first server 115a to the at least one downstream system 140; and/or the like.

According to some embodiments, the first queuing system 105a may be among a plurality of queuing systems 105a-105n that is part of a wider system (including, but not limited to, a logging system, or the like), the wider system having a plurality of working threads. In such a wider system, data from the at least one application 130 may be routed to two or more queuing systems among the plurality of queuing systems 105a-105n. For instance, as shown in FIG. 1, similar to the first queuing system 105a, the $N^{th}$ queuing system 105n may include, but is not limited to, $N^{th}$ queue 110n, $N^{th}$ server 115n, and $N^{th}$ controller 120n, where data 125n is received and stored by the $N^{th}$ queue 110n from the at least one application 130, data 135n is sent by the $N^{th}$ server 115n to one or more of the at least one downstream system 140, a response (or lack of response) is received by the $N^{th}$ server 115n from the one or more of the at least one downstream system 140 and is relayed as results to the $N^{th}$ controller 120n, and the state 110n' of the $N^{th}$ queue 110n is caused by the $N^{th}$ controller 120n to change from the first state to the second state, or vice versa, based on the received results.

In some cases, the plurality of data being routed to the two or more queuing systems may include a plurality of low priority data, whose lose may be inconsequential (e.g., some low priority log data, or the like). In some instances, the plurality of data may also include high (or higher) priority data, whose lose would be significant to operation of the wider system (or portions thereof). In such cases, these high (or higher priority) data may be routed to queuing systems that is configured to either minimize or prevent loss of data (e.g., a queuing system that has a queue whose state is permanently fixed in a blocking state, a queuing system that has a queue whose state changes between a bounded and an unbounded state, or a queuing system that has a queue whose package size capacity expands (in some cases, dynamically) to accommodate a larger (in some cases, growing) number of data packets, etc.).

In some embodiments, each queuing system 105, each server 115, or each controller 120 may be embodied as a computing system, which may include, without limitation, a local computing system, a cloud computing system, or a distributed computing system, and/or the like. Alternatively, or additionally, in some cases, the computing system may include, but is not limited to, one of a computing system of a network performance measurement system, a computing system of a system log ("syslog") message logging system, a computing system of a fault management system, or a computing system of a content delivery network ("CDN"), and/or the like. In some instances, the at least one downstream system 140 may include, without limitation, at least one of a network node, a network device, an analytics engine, a system performance analyzer, a network performance analyzer, or a fault management system, and/or the like.

In operation, a queuing system 105, a server 115, and/or a controller 120 (collectively, "computing system" or the like) may send, to a downstream system (e.g., at least one downstream system 140, or the like), first data (e.g., data 135a, or the like) among a plurality of data (e.g., data 135) that is stored in a first queue (e.g., queue 110a, or the like); may determine whether or not the first data has been successfully transmitted to and received by the downstream system [herein referred to as "transmission attempts"]; based on a determination that the first data has not been successfully received by the downstream system and when the first queue is in a first state, may analyze a number of successful transmission attempts and a number of unsuccessful transmission attempts within a first predetermined window, to determine whether a first trigger event has occurred [also referred to herein as "failure condition"]; and based on a determination that the first trigger event has occurred, may change a state of the first queue from the first state to a second state, the first and second states of the first queue defining how data is enqueued by the first queue.

In some embodiments, determining that the first trigger event has occurred based on the analysis may comprise at least one of: determining that the first trigger event has occurred based on a determination that a number of times that data has not been successfully received by the downstream system exceeds a first threshold number (e.g., 1, 2, 3, 4, 5, 6, 7, 8, 9, or 10, or the like, or a threshold number within a range between 1 and 10, or between 1 and 3, or between 1 and 5, or the like) within the first predetermined window, wherein the first predetermined window may comprise one of a sliding window having a first predetermined time duration (e.g., 1, 2, 3, 4, 5, 6, 7, 8, 9, 10, 20, 30, 40, 50, 60, 70, 80, 90, 100, 200, 300, 400, 500, 600, 700, 800, 900, or 1000 ms, or the like, or a duration within a range between 1 and 1000 ms, or between 1 and 500 ms, between 1 and 250 ms, between 1 and 100 ms, between 1 and 50 ms, or between 1 and 10 ms, or the like) or a sliding window having a first predetermined number of attempts (e.g., 10, 20, 30, 40, 50, 60, 70, 80, 90, 100, 200, 300, 400, 500, 600, 700, 800, 900, or 1000, or the like, or a number of attempts within a range between 10 and 1000, or between 10 and 500, between 10 and 250, between 10 and 100, or between 10 and 50, or the like); or determining that the first trigger event has occurred based on a determination that a number of consecutive unsuccessful transmission attempts equaling the first threshold number has occurred; and/or the like. Herein, the unsuccessful transmission attempts or the failure conditions either may include retry attempts (e.g., where each retry attempt is counted toward the number of times that data has not been successfully received by the downstream system, etc.) or may exclude retry attempts (e.g., where all retry attempts and the initial attempt for any particular data being transmitted to the downstream system is counted as a single attempt when counting toward the number of times that data has not been successfully received by the downstream system, etc.).

In some cases, each successful transmission attempt and each unsuccessful transmission attempt from within both the first predetermined window and a historical set of recorded attempts may be fed into an exponential decay filter having a configurable decay rate that defines a recent time-scale to produce a number that is an estimate of a success rate of a transmission channel. When the estimate of the success rate falls below a first predetermined value, the computing system may cause the state of the first queue to change from the first state to the second state. When the estimate of the success rate rises above a second predetermined value that is greater than the first predetermined value, the computing system may cause the state of the first queue to change from the second state to the first state.

According to some embodiments, based on a determination that the first data has been successfully received by the downstream system and when the first queue is in the second state, the computing system may analyze the number of successful transmission attempts and the number of unsuccessful transmission attempts within a second predetermined window, to determine whether a second trigger event has occurred [also referred to herein as "success condition"]; and based on a determination that the second trigger event has occurred, the computing system may change the state of the first queue from the second state to the first state.

In some cases, determining that the second trigger event has occurred based on the analysis may comprise at least one of: determining that the second trigger event has occurred based on a determination that a number of times that data has been successfully received by the downstream system exceeds a second threshold number (e.g., 10, 20, 25, 30, 40, 50, 75, 100, 150, 200, or 250, or the like, or a threshold number within a range between 10 and 250, or between 50 and 200, or between 100, and 200, or the like) within the second predetermined window, wherein the second predetermined window may comprise one of a sliding window having a second predetermined time duration (e.g., 1, 2, 3, 4, 5, 6, 7, 8, 9, 10, 20, 30, 40, 50, 60, 70, 80, 90, 100, 200, 300, 400, 500, 600, 700, 800, 900, or 1000 ms, or the like, or a duration within a range between 1 and 1000 ms, or between 1 and 500 ms, between 1 and 250 ms, between 1 and 100 ms, between 1 and 50 ms, or between 1 and 10 ms, or the like) or a sliding window having a second predetermined number of attempts (e.g., 20, 30, 40, 50, 60, 70, 80, 90, 100, 200, 300, 400, 500, 600, 700, 800, 900, or 1000, or the like, or a number of attempts within a range between 20 and 1000, or between 20 and 500, between 20 and 250, between 20 and 100, or between 20 and 50, or the like); determining that the second trigger event has occurred based on a determination that a number of consecutive successful transmission attempts equaling the second threshold number has occurred; or determining that a period since the first trigger event occurred exceeds a third predetermined time duration (e.g., 100, 200, 300, 400, 500, 600, 700, 800, 900, or 1000 ms, or the like, or a duration within a range between 100 and 1000 ms, or between 100 and 500 ms, or between 100 and 250 ms, or the like); and/or the like. Herein, counters and/or timers that may be used for tracking the number of transmission attempts and/or durations may be reset with each change of state of the queue(s) 110.

Figure 2A:
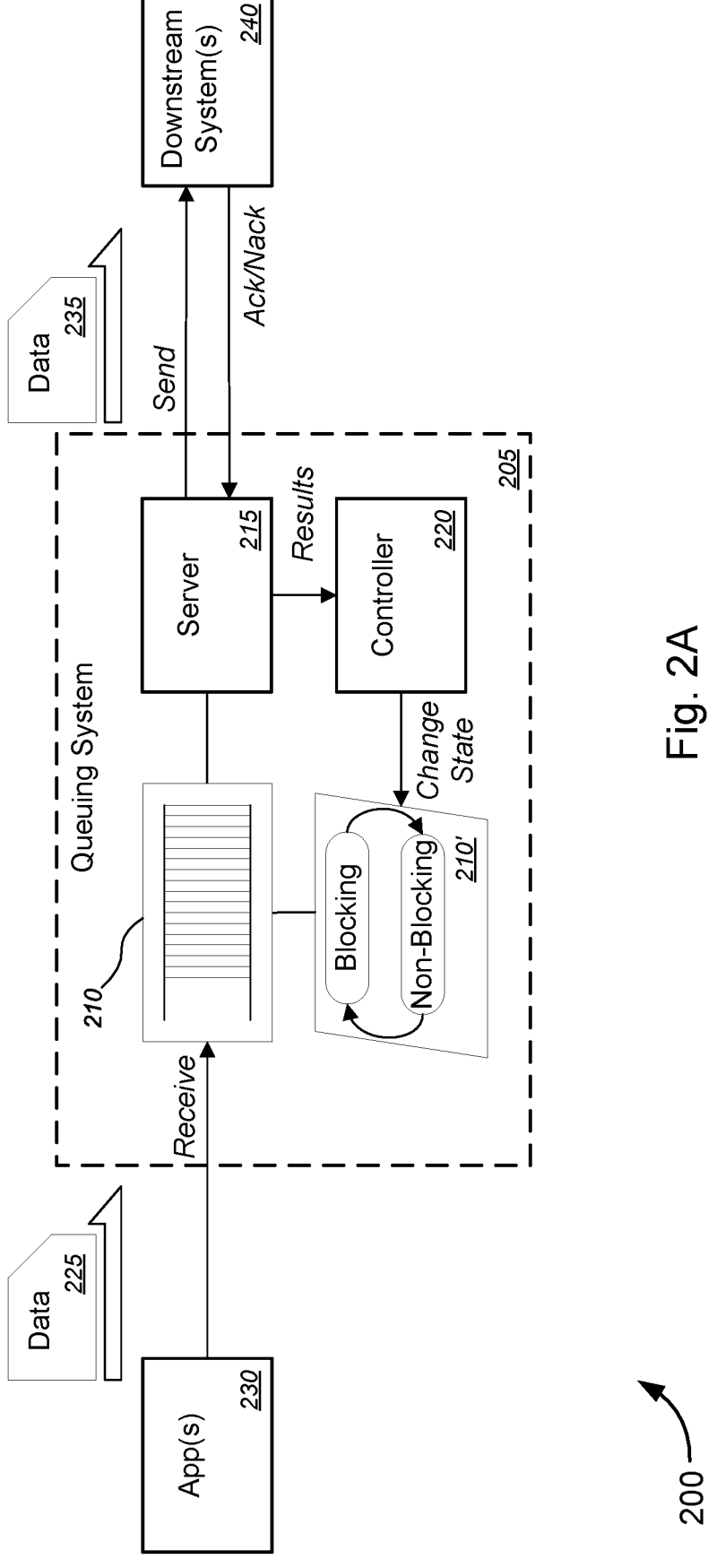
FIGS. 2A-2C are schematic diagrams illustrating a non-limiting example of a queuing system that causes a queue to change state between a blocking state and a non-blocking state when implementing intelligent queuing with feedback-driven admission controls, in accordance with various embodiments.
Figure 2B:
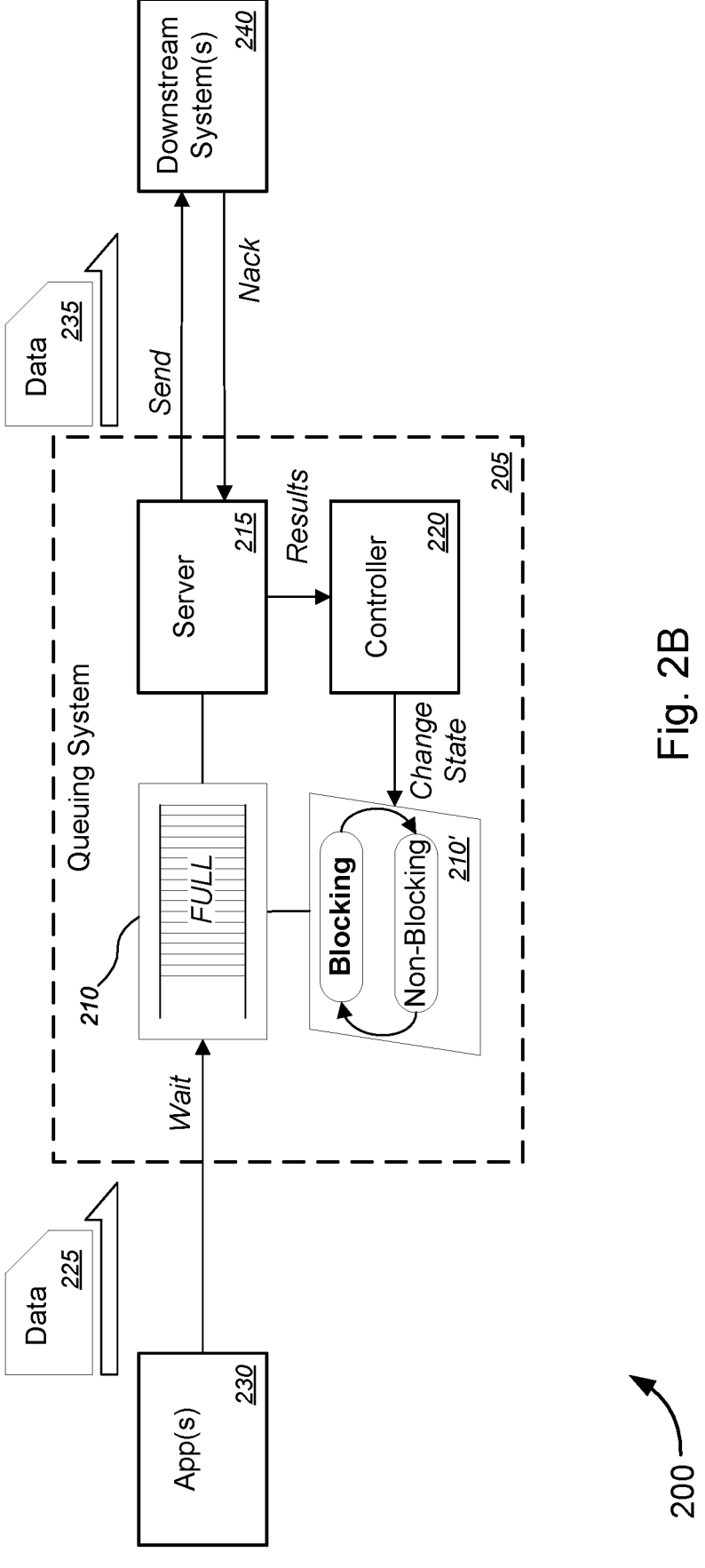
Figure 2C:
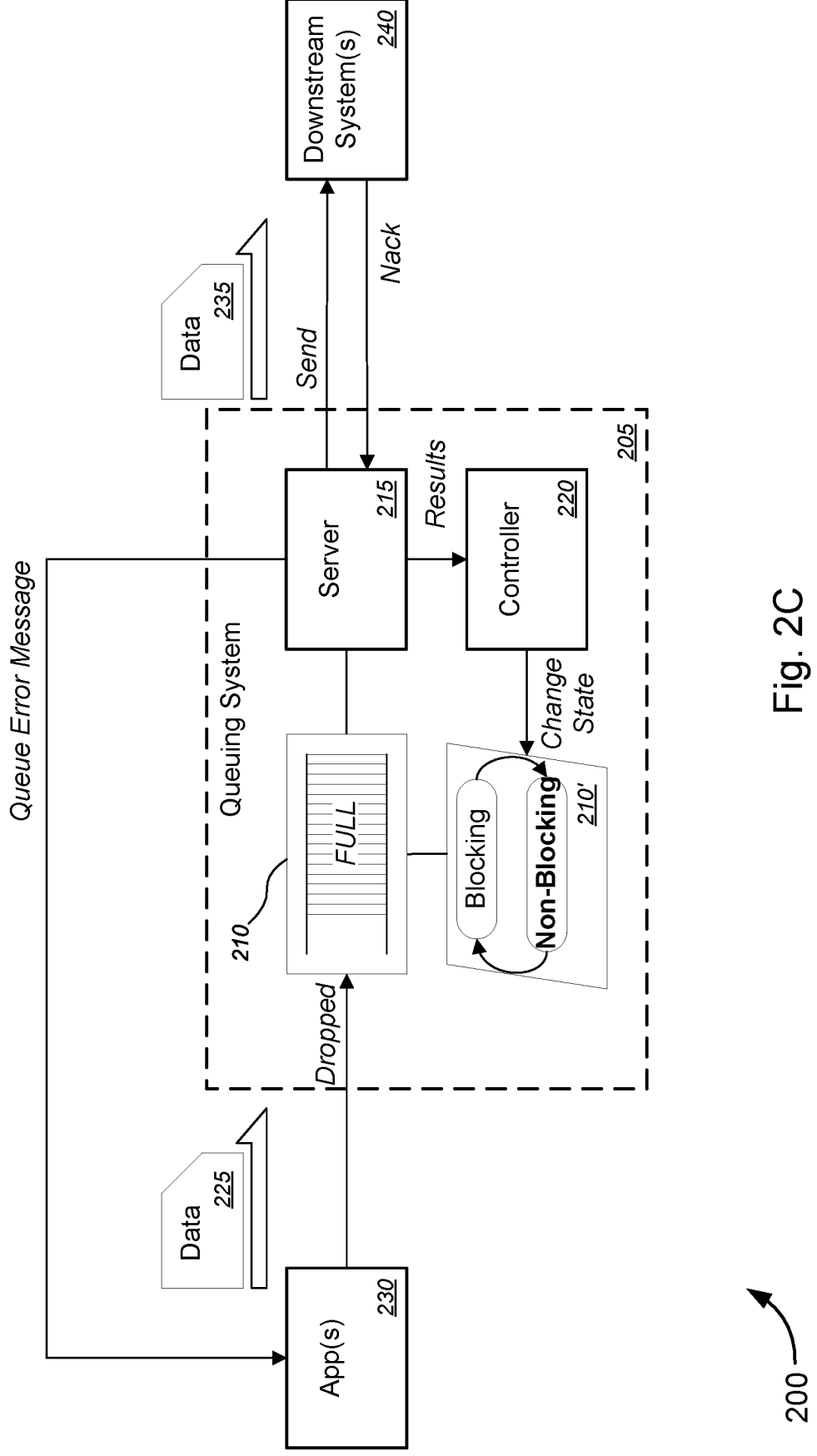

In some instances, changing the state of the first queue from the first state to the second state may comprise the computing system changing the state of the first queue from a blocking state to a non-blocking state (e.g., as shown in the non-limiting embodiment of FIGS. 2A-2C, or the like). In some cases, when the first queue is full and in the blocking state, the blocking state may cause second data that is subsequently received by the first queue to wait to enqueue in the first queue until the first queue is no longer full and is able to enqueue the second data. In some cases, when the first queue is full and in the non-blocking state, the non-blocking state may cause third data that is subsequently received by the first queue to fail to enqueue, resulting in the third data being dropped and a first queue error message being immediately sent to at least a source of the third data. In some instances, changing the state of the first queue from the blocking state to the non-blocking state may comprise the computing system changing a configurable time-out setting from a default non-zero-second timeout to a zero-second timeout. Herein, "non-zero-second timeout" may refer to a timeout that is 10 ms or more, while "zero-second timeout" may refer to a timeout that is less than 10 ms, or the like.

In some cases, changing the state of the first queue from the second state to the first state may comprise the computing system changing the state of the first queue from the non-blocking state to the blocking state. In some instances, changing the state of the first queue from the non-blocking state to the blocking state may comprise the computing system changing a configurable time-out setting from a zero-second timeout to a non-zero-second timeout.

In some embodiments, the computing system may comprise a server. In such cases, changing the state of the first queue from the first state to the second state may comprise the server (e.g., server 115a, or the like) causing a queue state controller (e.g., controller 120a, or the like) to change the state of the first queue from the first state to the second state. In some cases, changing the state of the first queue from the second state to the first state may comprise the server causing the queue state controller to change the state of the first queue from the second state to the first state.

Figure 3A:
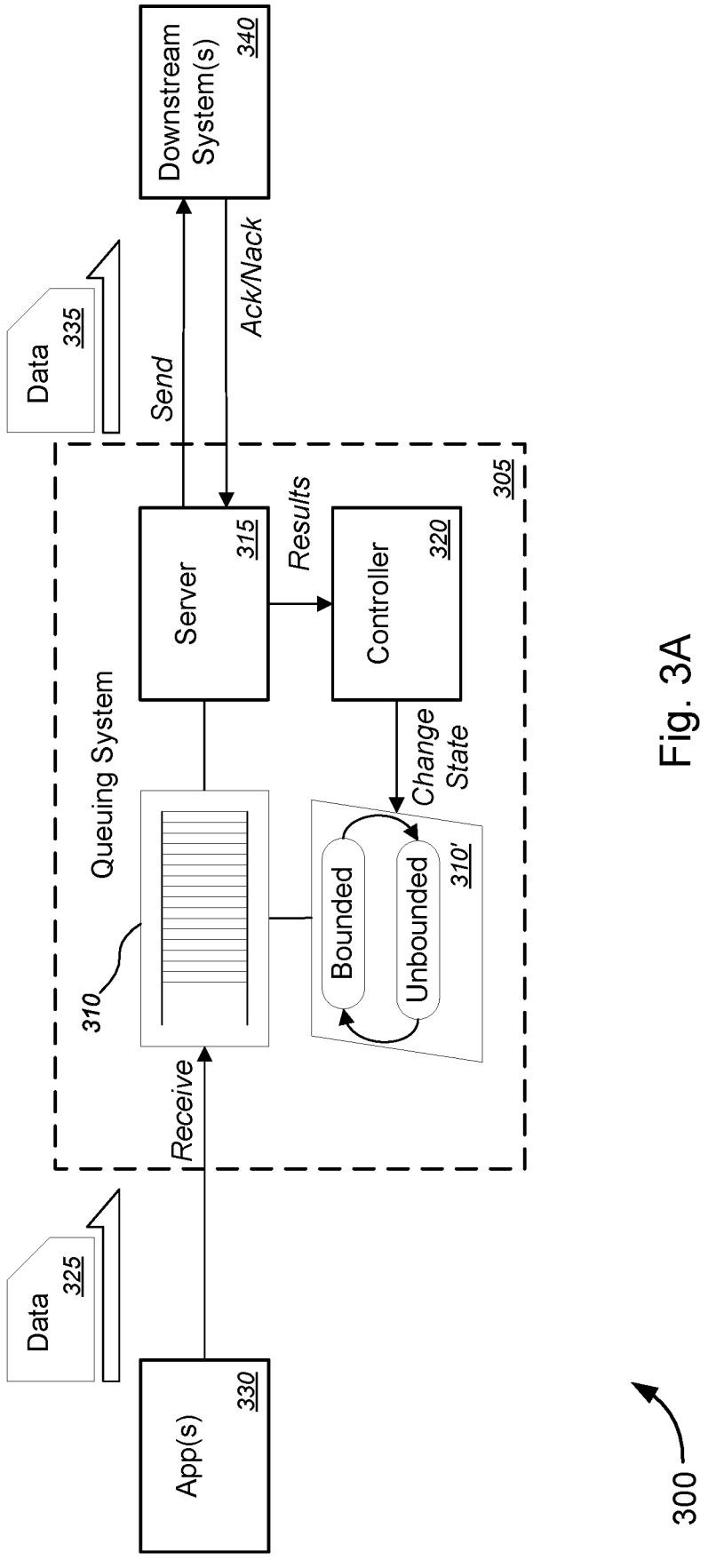
FIGS. 3A-3C are schematic diagrams illustrating a non-limiting example of a queuing system that causes a queue to change state between a bounded state and an unbounded state when implementing intelligent queuing with feedback-driven admission controls, in accordance with various embodiments.
Figure 3B:
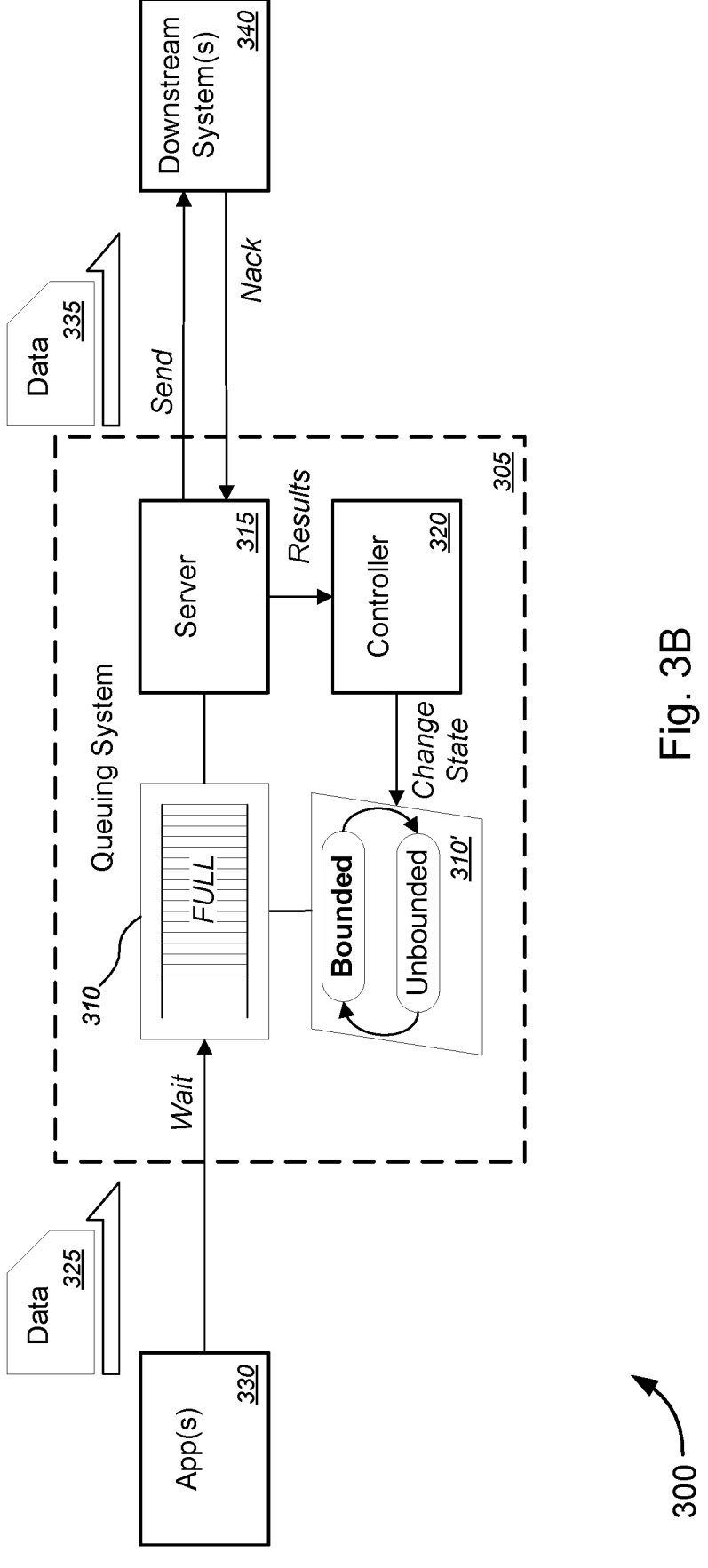
Figure 3C:
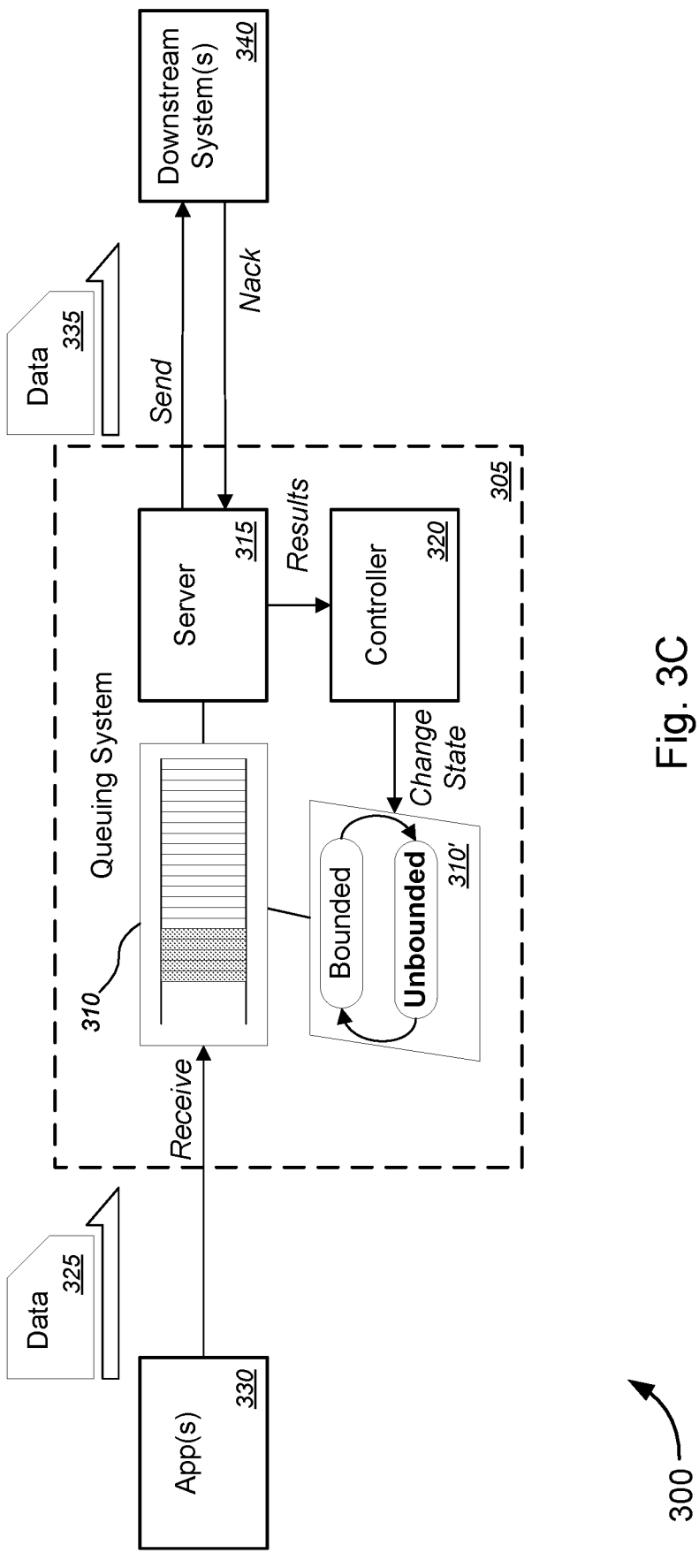

According to some embodiments, changing the state of the first queue from the first state to the second state may comprise the computing system changing the state of the first queue from a bounded state to an unbounded state (e.g., as shown in the non-limiting embodiment of FIGS. 3A-3C, or the like). In some cases, the bounded state may be a set capacity state and, when the first queue is full and in the bounded state, the bounded state may cause the first queue to prevent fourth data that is subsequently received by the first queue from enqueuing in the first queue until the first queue is no longer full and is able to enqueue the fourth data. In some instances, the unbounded state may be a state that allows the first queue to expand in capacity and, when the first queue is full and in the unbounded state, the unbounded state may cause the first queue to expand in capacity to enqueue fifth data that is subsequently received by the first queue.

In some cases, the plurality of data that is stored in the first queue may be stored as a plurality of data packets. In such cases, changing the state of the first queue from the first state to the second state may comprise the computing system changing the state of the first queue from a queue having a first packet size capacity to a queue having a second packet size capacity. In some instances, the second packet size capacity may dynamically change based on at least one of how many data packets have been successfully received by the downstream system, how many data packets have not been successfully received by the downstream system, which data packets have been successfully received by the downstream system, or which data packets have not been successfully received by the downstream system, and/or the like.

In some embodiments, determining whether or not the first data has been successfully transmitted to and received by the downstream system may comprise the computing system performing one of: receiving an Ack message from the downstream system indicating that the first data has been successfully received by the downstream system; receiving a Nack or Nak message from the downstream system indicating that the first data has not been successfully received by the downstream system; or receiving an error message from the downstream system indicating that the first data has not been successfully received by the downstream system; and/or the like.

According to some embodiments, the first queue may be among a plurality of queues that is part of a logging system having a plurality of working threads. In some cases, the plurality of data may comprise a plurality of low priority data.

In some aspects, a server (e.g., server 115n, or the like) may send, to a downstream system (e.g., at least one downstream system 140, or the like), first data (e.g., data 135n, or the like) among a plurality of data (e.g., data 135, or the like) that is stored in a first queue (e.g., queue 110n, or the like) among a plurality of queues that is part of a logging system (e.g., system 100, or the like) having a plurality of working threads. In such cases, the plurality of data may include a plurality of low priority data. The server may determine whether or not the first data has been successfully transmitted to and received by the downstream system. Based on a determination that the first data has not been successfully received by the downstream system and when the first queue is in a blocking state, the server may analyze a number of successful transmission attempts and a number of unsuccessful transmission attempts within a first predetermined window, to determine whether a first trigger event has occurred. Based on a determination that the first trigger event has occurred, the server may change a state of the first queue from the blocking state to a non-blocking state. In some cases, when the first queue is full and in the blocking state, the blocking state may cause second data that is subsequently received by the first queue to wait to enqueue in the first queue until the first queue is no longer full and is able to enqueue the second data. When the first queue is full and in the non-blocking state, the non-blocking state may cause third data that is subsequently received by the first queue to fail to enqueue, resulting in the third data being dropped and a first queue error message being immediately sent to at least a source of the third data. Based on a determination that the first data has been successfully received by the downstream system and when the first queue is in the non-blocking state, the server may analyze the number of successful transmission attempts and the number of unsuccessful transmission attempts within a second predetermined window, to determine whether a second trigger event has occurred. Based on a determination that the second trigger event has occurred, the server may change the state of the first queue from the non-blocking state to the blocking state.

In this manner, the queuing system is not held to waiting. Failure conditions at the downstream system may result in immediate notification being sent to the source of the data being sent to the queue. Actions or tasks may then be initiated by the source of the data.

These and other functions of the system 100 (and its components) are described in greater detail below with respect to FIGS. 2-4.

FIGS. 2A-2C (collectively, "FIG. 2") are schematic diagrams illustrating a non-limiting example 200 of a queuing system that causes a queue to change state between a blocking state and a non-blocking state when implementing intelligent queuing with feedback-driven admission controls, in accordance with various embodiments.

In the non-limiting example 200 of FIG. 2, queuing system 205, queue 210, queue state 210', server 215, controller 220, data 225, at least one application 230, data 235, and at least one downstream system 240 or FIG. 2 may be similar, if not identical, to a queuing system 105 among the one or more queuing systems 105a-105n, a queue 110 among the one or more queues 110a-110n, a queue state among the one or more queue states 110a'-110n' corresponding to queues 110a-110n, a server 115 among the one or more servers 115a-115n, a controller 120 among the one or more controllers 120a-120n, data among data 125a-125n, the at least one application 130, data among data 135a-135n, and the at least one downstream system 140, respectively, of system 100 of FIG. 1, and the description of these components of system 100 of FIG. 1 are similarly applicable to the corresponding components of FIG. 2.

In operation, with reference to FIG. 2A, queuing system 205 may receive data 225 from at least one application 230, and may enqueue (or store) data 225 in queue 210. Server 215 may subsequently dequeue (or retrieve) data 235 from queue 210, and may send data 235 to at least one downstream system 240. If successfully transmitted to and received by the at least one downstream system 240, the at least one downstream system 240 may send an Ack message to server 215 indicating that data 235 has been successfully received. If not successfully received by the at least one downstream system 240, the at least one downstream system 240 may send a Nack message (and/or an error message) to server 215 indicating that data 235 has not been successfully received.

Based on the results from the at least one downstream system 240 (i.e., the Ack or Nack message(s), and/or an error message, or the like) that are relayed by server 215, controller 220 may cause the state 210' of queue 210 to change from a blocking state to a non-blocking state or from a non-blocking state to a blocking state. In some instances, changing the state 210' of queue 210 from the blocking state to the non-blocking state may comprise controller 220 sending instructions to the queue 210 to change the state 210' of queue 210 from the blocking state to the non-blocking state. In some examples, changing the state 210' of queue 210 from the blocking state to the non-blocking state may comprise controller 220 changing a configurable time-out setting for queue 210 from a default non-zero-second timeout to a zero-second timeout. Herein, "non-zero-second timeout" may refer to a timeout that is 10 ms or more, while "zero-second timeout" may refer to a timeout that is less than 10 ms, or the like. Similarly, changing the state 210' of queue 210 from the non-blocking state to the blocking state may comprise controller 220 sending instructions to the queue 210 to change the state 210' of queue 210 from the non-blocking state to the blocking state. In some examples, changing the state 210' of queue 210 from the non-blocking state to the blocking state may comprise controller 220 changing a configurable time-out setting for queue 210 from the zero-second timeout to the default non-zero-second timeout.

In some examples, when the queue 210 is in the blocking state, the controller 220 may analyze a number of successful transmission attempts and a number of unsuccessful transmission attempts within a first predetermined window, to determine whether a first trigger event has occurred [i.e., "failure condition"]. If so, controller 220 may cause the state 210' of queue 210 to change from the blocking state to the non-blocking state. If not, controller 220 may allow the state 210' of queue 210 to remain in the blocking state.

Similar to the non-limiting examples of FIG. 1, determining that the first trigger event has occurred based on the analysis may comprise at least one of: determining that the first trigger event has occurred based on a determination that a number of times that data has not been successfully received by the downstream system 240 (e.g., based on receipt of the Nack message and/or an error message, or the like) exceeds a first threshold number (e.g., 1, 2, 3, 4, 5, 6, 7, 8, 9, or 10, or the like, or a threshold number within a range between 1 and 10, or between 1 and 3, or between 1 and 5, or the like) within the first predetermined window, wherein the first predetermined window may comprise one of a sliding window having a first predetermined time duration (e.g., 1, 2, 3, 4, 5, 6, 7, 8, 9, 10, 20, 30, 40, 50, 60, 70, 80, 90, 100, 200, 300, 400, 500, 600, 700, 800, 900, or 1000 ms, or the like, or a duration within a range between 1 and 1000 ms, or between 1 and 500 ms, between 1 and 250 ms, between 1 and 100 ms, between 1 and 50 ms, or between 1 and 10 ms, or the like) or a sliding window having a first predetermined number of attempts (e.g., 10, 20, 30, 40, 50, 60, 70, 80, 90, 100, 200, 300, 400, 500, 600, 700, 800, 900, or 1000, or the like, or a number of attempts within a range between 10 and 1000, or between 10 and 500, between 10 and 250, between 10 and 100, or between 10 and 50, or the like); or determining that the first trigger event has occurred based on a determination that a number of consecutive unsuccessful transmission attempts equaling the first threshold number has occurred; and/or the like.

In some cases, each successful transmission attempt and each unsuccessful transmission attempt from within both the first predetermined window and a historical set of recorded attempts may be fed into an exponential decay filter having a configurable decay rate that defines a recent time-scale to produce a number that is an estimate of a success rate of a transmission channel. When the estimate of the success rate falls below a first predetermined value, the controller 220 may cause the state of the first queue to change from the first state to the second state. When the estimate of the success rate rises above a second predetermined value that is greater than the first predetermined value, the controller 220 may cause the state of the first queue to change from the second state to the first state.

In some examples, when the queue 210 is in the non-blocking state, the controller 220 may analyze the number of successful transmission attempts and the number of unsuccessful transmission attempts within a second predetermined window, to determine whether a second trigger event has occurred [i.e., "success condition"]. If so, controller 220 may cause the state 210' of queue 210 to change from the non-blocking state to the blocking state. If not, controller 220 may allow the state 210' of queue 210 to remain in the non-blocking state.

Similar to the non-limiting examples of FIG. 1, determining that the second trigger event has occurred based on the analysis may comprise at least one of: determining that the second trigger event has occurred based on a determination that a number of times that data has been successfully received by the downstream system 240 (e.g., based on receipt of the Ack message, or the like) exceeds a second threshold number (e.g., 10, 20, 25, 30, 40, 50, 75, 100, 150, 200, or 250, or the like, or a threshold number within a range between 10 and 250, or between 50 and 200, or between 100, and 200, or the like) within the second predetermined window, wherein the second predetermined window may comprise one of a sliding window having a second predetermined time duration (e.g., 1, 2, 3, 4, 5, 6, 7, 8, 9, 10, 20, 30, 40, 50, 60, 70, 80, 90, 100, 200, 300, 400, 500, 600, 700, 800, 900, or 1000 ms, or the like, or a duration within a range between 1 and 1000 ms, or between 1 and 500 ms, between 1 and 250 ms, between 1 and 100 ms, between 1 and 50 ms, or between 1 and 10 ms, or the like) or a sliding window having a second predetermined number of attempts (e.g., 20, 30, 40, 50, 60, 70, 80, 90, 100, 200, 300, 400, 500, 600, 700, 800, 900, or 1000, or the like, or a number of attempts within a range between 20 and 1000, or between 20 and 500, between 20 and 250, between 20 and 100, or between 20 and 50, or the like); determining that the second trigger event has occurred based on a determination that a number of consecutive successful transmission attempts equaling the second threshold number has occurred; or determining that a period since the first trigger event occurred exceeds a third predetermined time duration (e.g., 100, 200, 300, 400, 500, 600, 700, 800, 900, or 1000 ms, or the like, or a duration within a range between 100 and 1000 ms, or between 100 and 500 ms, or between 100 and 250 ms, or the like); and/or the like.

According to some embodiments, when queue 210 is full and in the blocking state (as shown, e.g., in the non-limiting example of FIG. 2B, or the like), the blocking state may cause data 225 that is subsequently received by queue 210 to wait to enqueue in queue 210 until queue 210 is no longer full and is able to enqueue the data 225.

In some embodiments, when queue 210 is full and in the non-blocking state (as shown, e.g., in the non-limiting example of FIG. 2C, or the like), the non-blocking state may cause data 225 that is subsequently received by queue 210 to fail to enqueue, resulting in data 225 being dropped or lost and a queue error message being immediately sent to at least a source of the data 225 (in this case, the at least one application 230 (as shown, e.g., in FIG. 2C by the error feedback loop from the server 215 to the at least one application 230, or the like)).

These and other functions of the example 200 (and its components) are described in greater detail herein with respect to FIGS. 1, 3, and 4.

FIGS. 3A-3C (collectively, "FIG. 3") are schematic diagrams illustrating a non-limiting example 300 of a queuing system that causes a queue to change state between a bounded state and an unbounded state when implementing intelligent queuing with feedback-driven admission controls, in accordance with various embodiments.

In the non-limiting example 300 of FIG. 3, queuing system 305, queue 310, queue state 310', server 315, controller 320, data 325, at least one application 330, data 335, and at least one downstream system 340 or FIG. 3 may be similar, if not identical, to a queuing system 105 among the one or more queuing systems 105a-105n, a queue 110 among the one or more queues 110a-110n, a queue state among the one or more queue states 110a'-110n' corresponding to queues 110a-110n, a server 115 among the one or more servers 115a-115n, a controller 120 among the one or more controllers 120a-120n, data among data 125a-125n, the at least one application 130, data among data 135a-135n, and the at least one downstream system 140, respectively, of system 100 of FIG. 1, and the description of these components of system 100 of FIG. 1 are similarly applicable to the corresponding components of FIG. 3.

In operation, with reference to FIG. 3A, queuing system 305 may receive data 325 from at least one application 330, and may enqueue (or store) data 325 in queue 310. Server 315 may subsequently dequeue (or retrieve) data 335 from queue 310, and may send data 335 to at least one downstream system 340. If successfully transmitted to and received by the at least one downstream system 340, the at least one downstream system 340 may send an Ack message to server 315 indicating that data 335 has been successfully received. If not successfully received by the at least one downstream system 340, the at least one downstream system 340 may send a Nack message (and/or an error message) to server 315 indicating that data 335 has not been successfully received.

Based on the results from the at least one downstream system 340 (i.e., the Ack or Nack message(s), and/or an error message, or the like) that are relayed by server 315, controller 320 may cause the state 310' of queue 310 to change from a bounded state to an unbounded state or from an unbounded state to a bounded state. In some instances, changing the state 310' of queue 310 from the bounded state to the unbounded state may comprise controller 320 sending instructions to the queue 310 to change the state 310' of queue 310 from the bounded state to the unbounded state. Similarly, changing the state 310' of queue 310 from the unbounded state to the bounded state may comprise controller 320 sending instructions to the queue 310 to change the state 310' of queue 310 from the unbounded state to the bounded state.

In some examples, when the queue 310 is in the bounded state, the controller 320 may analyze a number of successful transmission attempts and a number of unsuccessful transmission attempts within a first predetermined window, to determine whether a first trigger event has occurred [i.e., "failure condition"]. If so, controller 320 may cause the state 310' of queue 310 to change from the bounded state to the unbounded state. If not, controller 320 may allow the state 310' of queue 310 to remain in the bounded state.

Similar to the non-limiting examples of FIGS. 1 and 2, determining that the first trigger event has occurred based on the analysis may comprise at least one of: determining that the first trigger event has occurred based on a determination that a number of times that data has not been successfully received by the downstream system 340 (e.g., based on receipt of the Nack message and/or an error message, or the like) exceeds a first threshold number (e.g., 1, 2, 3, 4, 5, 6, 7, 8, 9, or 10, or the like, or a threshold number within a range between 1 and 10, or between 1 and 3, or between 1 and 5, or the like) within the first predetermined window, wherein the first predetermined window may comprise one of a sliding window having a first predetermined time duration (e.g., 1, 2, 3, 4, 5, 6, 7, 8, 9, 10, 20, 30, 40, 50, 60, 70, 80, 90, 100, 200, 300, 400, 500, 600, 700, 800, 900, or 1000 ms, or the like, or a duration within a range between 1 and 1000 ms, or between 1 and 500 ms, between 1 and 250 ms, between 1 and 100 ms, between 1 and 50 ms, or between 1 and 10 ms, or the like) or a sliding window having a first predetermined number of attempts (e.g., 10, 20, 30, 40, 50, 60, 70, 80, 90, 100, 200, 300, 400, 500, 600, 700, 800, 900, or 1000, or the like, or a number of attempts within a range between 10 and 1000, or between 10 and 500, between 10 and 250, between 10 and 100, or between 10 and 50, or the like); or determining that the first trigger event has occurred based on a determination that a number of consecutive unsuccessful transmission attempts equaling the first threshold number has occurred; and/or the like.

In some cases, each successful transmission attempt and each unsuccessful transmission attempt from within both the first predetermined window and a historical set of recorded attempts may be fed into an exponential decay filter having a configurable decay rate that defines a recent time-scale to produce a number that is an estimate of a success rate of a transmission channel. When the estimate of the success rate falls below a first predetermined value, the controller 320 may cause the state of the first queue to change from the first state to the second state. When the estimate of the success rate rises above a second predetermined value that is greater than the first predetermined value, the controller 320 may cause the state of the first queue to change from the second state to the first state.

In some examples, when the queue 310 is in the unbounded state, the controller 320 may analyze the number of successful transmission attempts and the number of unsuccessful transmission attempts within a second predetermined window, to determine whether a second trigger event has occurred [i.e., "success condition" ]. If so, controller 320 may cause the state 310' of queue 310 to change from the unbounded state to the bounded state. If not, controller 320 may allow the state 310' of queue 310 to remain in the unbounded state.

Similar to the non-limiting examples of FIGS. 1 and 2, determining that the second trigger event has occurred based on the analysis may comprise at least one of: determining that the second trigger event has occurred based on a determination that a number of times that data has been successfully received by the downstream system 340 (e.g., based on receipt of the Ack message, or the like) exceeds a second threshold number (e.g., 10, 20, 25, 30, 40, 50, 75, 100, 150, 200, or 250, or the like, or a threshold number within a range between 10 and 250, or between 50 and 200, or between 100, and 200, or the like) within the second predetermined window, wherein the second predetermined window may comprise one of a sliding window having a second predetermined time duration (e.g., 1, 2, 3, 4, 5, 6, 7, 8, 9, 10, 20, 30, 40, 50, 60, 70, 80, 90, 100, 200, 300, 400, 500, 600, 700, 800, 900, or 1000 ms, or the like, or a duration within a range between 1 and 1000 ms, or between 1 and 500 ms, between 1 and 250 ms, between 1 and 100 ms, between 1 and 50 ms, or between 1 and 10 ms, or the like) or a sliding window having a second predetermined number of attempts (e.g., 20, 30, 40, 50, 60, 70, 80, 90, 100, 200, 300, 400, 500, 600, 700, 800, 900, or 1000, or the like, or a number of attempts within a range between 20 and 1000, or between 20 and 500, between 20 and 250, between 20 and 100, or between 20 and 50, or the like); determining that the second trigger event has occurred based on a determination that a number of consecutive successful transmission attempts equaling the second threshold number has occurred; or determining that a period since the first trigger event occurred exceeds a third predetermined time duration (e.g., 100, 200, 300, 400, 500, 600, 700, 800, 900, or 1000 ms, or the like, or a duration within a range between 100 and 1000 ms, or between 100 and 500 ms, or between 100 and 250 ms, or the like); and/or the like.

According to some embodiments, when queue 310 is full and in the bounded state (as shown, e.g., in the non-limiting example of FIG. 3B, or the like), the bounded state may cause data 325 that is subsequently received by queue 310 to wait to enqueue in queue 310 until queue 310 is no longer full and is able to enqueue the data 325.

In some embodiments, when queue 310 is full and in the unbounded state (as shown, e.g., in the non-limiting example of FIG. 3C, or the like), the unbounded state may cause queue 310 to expand in capacity to enqueue data 325 that is subsequently received by the queue 310 (as shown, e.g., in FIG. 3C by the expanded portions of queue 310 that are highlighted in gray color, or the like).

In some cases, the plurality of data 335 that is stored in the queue 310 may be stored as a plurality of data packets. In such cases, changing the state 310' of the queue 310 from the bounded state to the unbounded state may comprise the controller changing the state 310' of the queue 310 from a queue having a first packet size capacity to a queue having a second packet size capacity. In some instances, the second packet size capacity may dynamically change based on at least one of how many data packets have been successfully received by the at least one downstream system 340, how many data packets have not been successfully received by the at least one downstream system 340, which data packets have been successfully received by the at least one downstream system 340, or which data packets have not been successfully received by the at least one downstream system 340, and/or the like.

These and other functions of the example 300 (and its components) are described in greater detail herein with respect to FIGS. 1, 2, and 4.

FIGS. 4A-4D (collectively, "FIG. 4") are flow diagrams illustrating a method 400 for implementing intelligent queuing with feedback-driven admission controls, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

In the non-limiting embodiment of FIG. 4A, method 400, at block 405, may comprise sending, by a computing system and to a downstream system, first data among a plurality of data that is stored in a first queue. At block 410, method 400 may comprise determining, by the computing system, whether or not the first data has been successfully transmitted to and received by the downstream system. If not, method 400 may continue onto the process at block 415. If so, method 400 may continue onto the process at block 430. At block 415, method 400 may comprise, based on a determination that the first data has not been successfully received by the downstream system, determining, by the computing system, whether the first queue is in a first state. If not, method 400 may return to the process at block 405. If so, method 400 may continue onto the process at block 420, at which method 400 may comprise analyzing, by the computing system, a number of successful transmission attempts and a number of unsuccessful transmission attempts within a first predetermined window, to determine whether a first trigger event has occurred. If so, method 400 may continue onto the process at block 425, at which method 400 may comprise changing, by the computing system, a state of the first queue from the first state to a second state, the first and second states of the first queue defining how data is enqueued by the first queue. If not, method 400 may return to the process at block 405.

Similar to the non-limiting examples of FIGS. 1-3, determining that the first trigger event has occurred based on the analysis may comprise at least one of: determining that the first trigger event has occurred based on a determination that a number of times that data has not been successfully received by the downstream system exceeds a first threshold number (e.g., 1, 2, 3, 4, 5, 6, 7, 8, 9, or 10, or the like, or a threshold number within a range between 1 and 10, or between 1 and 3, or between 1 and 5, or the like) within the first predetermined window, wherein the first predetermined window may comprise one of a sliding window having a first predetermined time duration (e.g., 1, 2, 3, 4, 5, 6, 7, 8, 9, 10, 20, 30, 40, 50, 60, 70, 80, 90, 100, 200, 300, 400, 500, 600, 700, 800, 900, or 1000 ms, or the like, or a duration within a range between 1 and 1000 ms, or between 1 and 500 ms, between 1 and 250 ms, between 1 and 100 ms, between 1 and 50 ms, or between 1 and 10 ms, or the like) or a sliding window having a first predetermined number of attempts (e.g., 10, 20, 30, 40, 50, 60, 70, 80, 90, 100, 200, 300, 400, 500, 600, 700, 800, 900, or 1000, or the like, or a number of attempts within a range between 10 and 1000, or between 10 and 500, between 10 and 250, between 10 and 100, or between 10 and 50, or the like); or determining that the first trigger event has occurred based on a determination that a number of consecutive unsuccessful transmission attempts equaling the first threshold number has occurred; and/or the like.

In some cases, although not shown in FIG. 4, method 400 may further comprise feeding each successful transmission attempt and each unsuccessful transmission attempt from within both the first predetermined window and a historical set of recorded attempts into an exponential decay filter having a configurable decay rate that defines a recent time-scale to produce a number that is an estimate of a success rate of a transmission channel; when the estimate of the success rate falls below a first predetermined value, causing the state of the first queue to change from the first state to the second state; and when the estimate of the success rate rises above a second predetermined value that is greater than the first predetermined value, causing the state of the first queue to change from the second state to the first state.

At block 430, method 400 may comprise, based on a determination that the first data has been successfully received by the downstream system, determining, by the computing system, whether the first queue is in the second state. If not, method 400 may return to the process at block 405. If so, method 400 may continue onto the process at block 435, at which method 400 may comprise analyzing, by the computing system, the number of successful transmission attempts and the number of unsuccessful transmission attempts within a second predetermined window, to determine whether a second trigger event has occurred. If not, method 400 may return to the process at block 405. If so, method 400 may continue onto the process at block 440, changing, by the computing system, the state of the first queue from the second state to the first state.

Similar to the non-limiting examples of FIGS. 1-3, determining that the second trigger event has occurred based on the analysis may comprise at least one of: determining that the second trigger event has occurred based on a determination that a number of times that data has been successfully received by the downstream system exceeds a second threshold number (e.g., 10, 20, 25, 30, 40, 50, 75, 100, 150, 200, or 250, or the like, or a threshold number within a range between 10 and 250, or between 50 and 200, or between 100, and 200, or the like) within the second predetermined window, wherein the second predetermined window may comprise one of a sliding window having a second predetermined time duration (e.g., 1, 2, 3, 4, 5, 6, 7, 8, 9, 10, 20, 30, 40, 50, 60, 70, 80, 90, 100, 200, 300, 400, 500, 600, 700, 800, 900, or 1000 ms, or the like, or a duration within a range between 1 and 1000 ms, or between 1 and 500 ms, between 1 and 250 ms, between 1 and 100 ms, between 1 and 50 ms, or between 1 and 10 ms, or the like) or a sliding window having a second predetermined number of attempts (e.g., 20, 30, 40, 50, 60, 70, 80, 90, 100, 200, 300, 400, 500, 600, 700, 800, 900, or 1000, or the like, or a number of attempts within a range between 20 and 1000, or between 20 and 500, between 20 and 250, between 20 and 100, or between 20 and 50, or the like); determining that the second trigger event has occurred based on a determination that a number of consecutive successful transmission attempts equaling the second threshold number has occurred; or determining that a period since the first trigger event occurred exceeds a third predetermined time duration (e.g., 100, 200, 300, 400, 500, 600, 700, 800, 900, or 1000 ms, or the like, or a duration within a range between 100 and 1000 ms, or between 100 and 500 ms, or between 100 and 250 ms, or the like); and/or the like.

In some embodiments, the computing system may include, without limitation, at least one of a queuing system, a queue state controller, a server, a cloud computing system, or a distributed computing system, and/or the like. Alternatively, or additionally, in some cases, the computing system may include, but is not limited to, one of a computing system of a network performance measurement system, a computing system of a system log ("syslog") message logging system, a computing system of a fault management system, or a computing system of a content delivery network ("CDN"), and/or the like. In some instances, the downstream system may include, without limitation, at least one of a network node, a network device, an analytics engine, a system performance analyzer, a network performance analyzer, or a fault management system, and/or the like.

With reference to the non-limiting example of FIG. 4B, changing the state of the first queue from the first state to the second state (at block 425) comprise changing, by the computing system, the state of the first queue from a blocking state to a non-blocking state (block 445). In some cases, when the first queue is full and in the blocking state, the blocking state may cause second data that is subsequently received by the first queue to wait to enqueue in the first queue until the first queue is no longer full and is able to enqueue the second data. In some cases, when the first queue is full and in the non-blocking state, the non-blocking state may cause third data that is subsequently received by the first queue to fail to enqueue, resulting in the third data being dropped and a first queue error message being immediately sent to at least a source of the third data. In some instances, changing the state of the first queue from the blocking state to the non-blocking state (at block 445) may comprise changing, by the computing system, a configurable time-out setting from a default non-zero-second timeout to a zero-second timeout (block 450).

Alternatively, changing the state of the first queue from the first state to the second state (at block 425) comprise causing, by the server, a queue state controller to change the state of the first queue from the first state to the second state (block 455).

Alternatively, changing the state of the first queue from the first state to the second state (at block 425) comprise changing, by the computing system, the state of the first queue from a bounded state to an unbounded state (block 460). In some cases, the bounded state may be a set capacity state and, when the first queue is full and in the bounded state, the bounded state may cause the first queue to prevent fourth data that is subsequently received by the first queue from enqueuing in the first queue until the first queue is no longer full and is able to enqueue the fourth data. In some instances, the unbounded state may be a state that allows the first queue to expand in capacity and, when the first queue is full and in the unbounded state, the unbounded state may cause the first queue to expand in capacity to enqueue fifth data that is subsequently received by the first queue.

Alternatively, the plurality of data that is stored in the first queue may be stored as a plurality of data packets. In such cases, changing the state of the first queue from the first state to the second state (at block 425) comprise changing, by the computing system, the state of the first queue from a queue having a first packet size capacity to a queue having a second packet size capacity (block 465). In some instances, the second packet size capacity may dynamically change based on at least one of how many data packets have been successfully received by the downstream system, how many data packets have not been successfully received by the downstream system, which data packets have been successfully received by the downstream system, or which data packets have not been successfully received by the downstream system, and/or the like.

In a similar manner, as shown in the non-limiting example of FIG. 4C, changing the state of the first queue from the second state to the first state (at block 440) may comprise changing, by the computing system, the state of the first queue from the non-blocking state to the blocking state (block 470). In some instances, changing the state of the first queue from the non-blocking state to the blocking state (at block 470) may comprise changing, by the computing system, a configurable time-out setting from a zero-second timeout to a non-zero-second timeout (block 475).

Alternatively, changing the state of the first queue from the second state to the first state (at block 440) may comprise causing, by the server, the queue state controller to change the state of the first queue from the second state to the first state (block 480).

Alternatively, changing the state of the first queue from the second state to the first state (at block 440) may comprise changing, by the computing system, the state of the first queue from the unbounded state to the bounded state (block 485).

Alternatively, changing the state of the first queue from the second state to the first state (at block 440) may comprise changing, by the computing system, the state of the first queue from the queue having the second packet size capacity to the queue having the first packet size capacity (block 490).

Figure 4D:
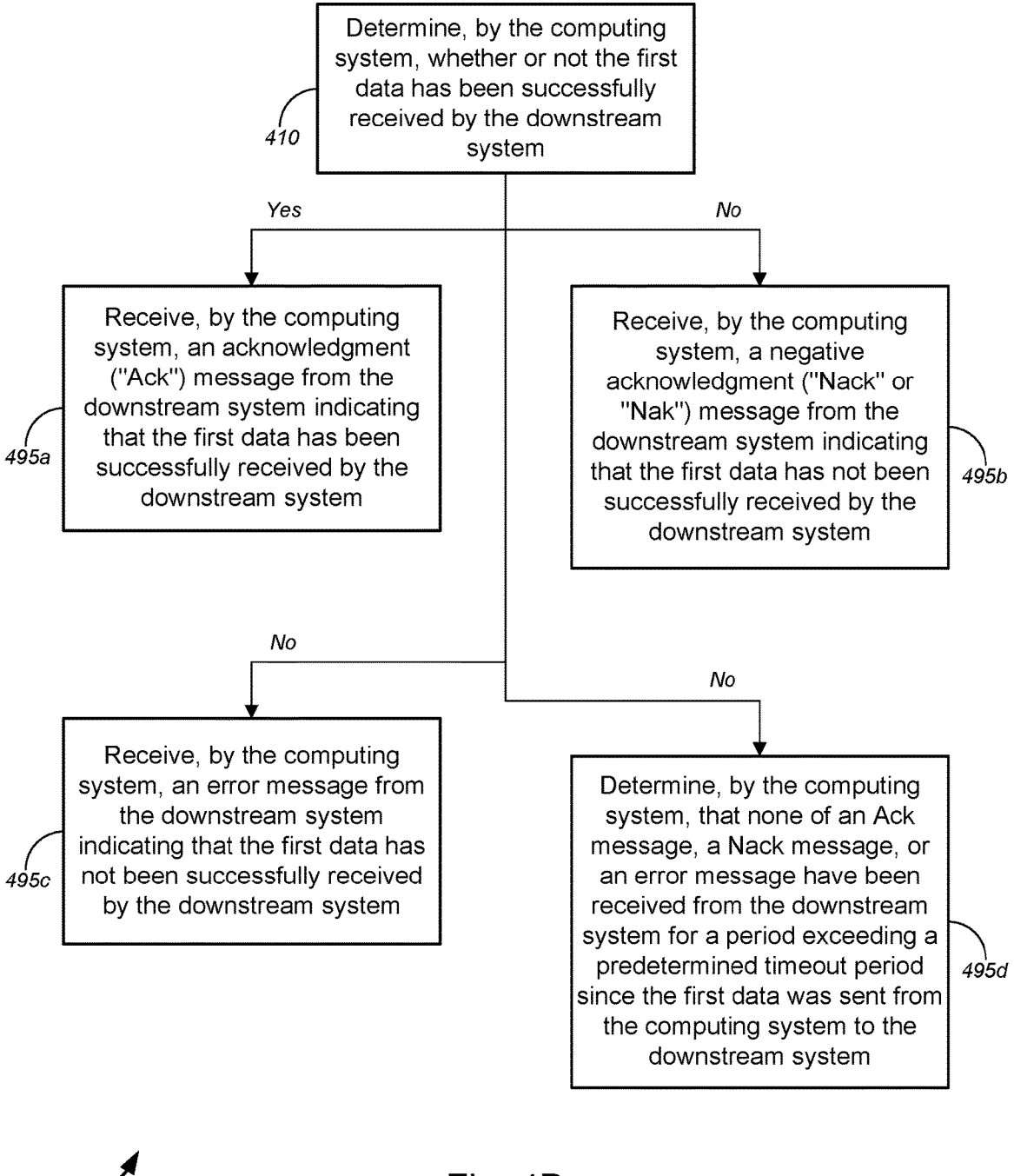

Referring to the non-limiting example of FIG. 4D, determining whether or not the first data has been successfully transmitted to and received by the downstream system (at block 410) may comprise one of: receiving, by the computing system, an acknowledgment ("Ack") message from the downstream system indicating that the first data has been successfully received by the downstream system (block 495a); receiving, by the computing system, a negative acknowledgment ("Nack" or "Nak") message from the downstream system indicating that the first data has not been successfully received by the downstream system (block 495b); receiving, by the computing system, an error message from the downstream system indicating that the first data has not been successfully received by the downstream system (block 495c); or determining, by the computing system, that none of an Ack message, a Nack message, or an error message have been received from the downstream system for a period exceeding a predetermined timeout period since the first data was sent from the computing system to the downstream system (block 495d); and/or the like. In some cases, the predetermined timeout period may include, but is not limited to, e.g., 25, 50, 75, 100, 200, 300, 400, 500, 1000 ms or longer, or a timeout period within a range between 1 ms and 1 s, or between 100 ms and 1 s, or between 500 ms and 1 s, or greater than 1 s, or the like.

According to some embodiments, the first queue may be among a plurality of queues that is part of a logging system having a plurality of working threads. In some cases, the plurality of data may comprise a plurality of low priority data.

Exemplary System and Hardware Implementation

Figure 5:
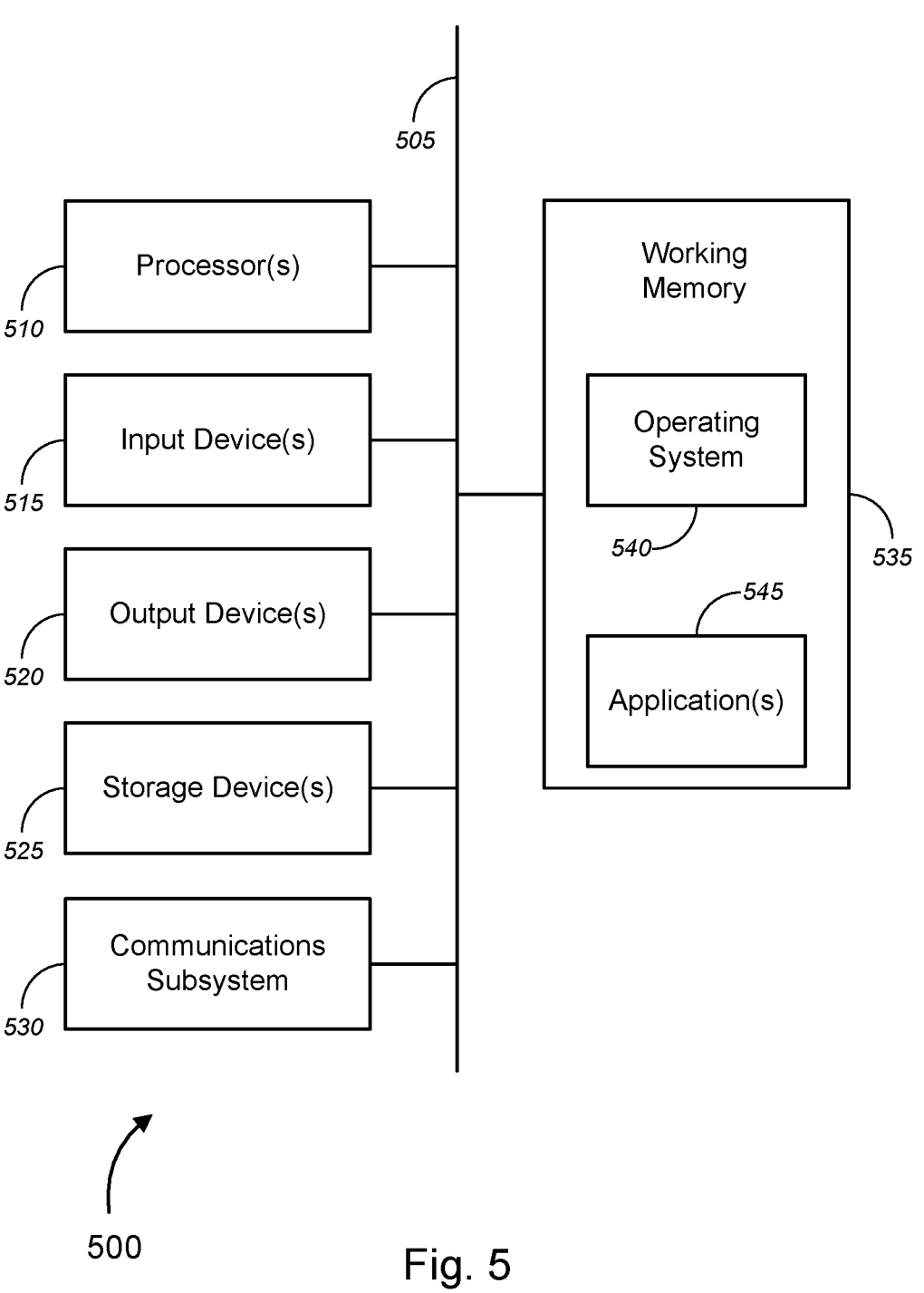
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., queuing systems 105a-105n, 205, and 305, servers 115a-115n, 215, and 315, controllers 120a-120n, 220, and 320, downstream systems 140, 240, and 340, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., queuing systems 105a-105n, 205, and 305, servers 115a-115n, 215, and 315, controllers 120a-120n, 220, and 320, downstream systems 140, 240, and 340, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a Wi-Fi device, a WiMAX device, a wireless wide area network ("WWAN") device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, virtual machines ("VMs"), and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

sending, by a computing system and to a downstream system, first data among a plurality of data that is stored in a first queue;

determining, by the computing system, that the first data has not been successfully transmitted to and received by the downstream system;

determining, by the computing system, that the first queue is in a first state;

analyzing, by the computing system, a number of successful transmission attempts and a number of unsuccessful transmission attempts within a first predetermined window, to determine that a first trigger event has occurred; and changing, by the computing system, a state of the first queue from the first state to a second state, the first and second states of the first queue defining how data is enqueued by the first queue.

2. The method of claim 1, wherein the computing system comprises at least one of a queuing system, a queue state controller, a server, a cloud computing system, or a distributed computing system.

3. The method of claim 1, wherein the computing system comprises one of a computing system of a network performance measurement system, a computing system of a system log ("syslog") message logging system, a computing system of a fault management system, or a computing system of a content delivery network ("CDN").

4. The method of claim 1, wherein determining that the first trigger event has occurred based on the analysis comprises at least one of:

determining that the first trigger event has occurred based on a determination that a number of times that data has not been successfully received by the downstream system exceeds a first threshold number within the first predetermined window, wherein the first predetermined window comprises one of a sliding window having a first predetermined time duration or a sliding window having a first predetermined number of attempts; or determining that the first trigger event has occurred based on a determination that a number of consecutive unsuccessful transmission attempts equaling the first threshold number has occurred.

5. The method of claim 4, further comprising:

feeding each successful transmission attempt and each unsuccessful transmission attempt from within both the first predetermined window and a historical set of recorded attempts into an exponential decay filter having a configurable decay rate that defines a recent time-scale to produce a number that is an estimate of a success rate of a transmission channel;

when the estimate of the success rate falls below a first predetermined value, causing the state of the first queue to change from the first state to the second state; and when the estimate of the success rate rises above a second predetermined value that is greater than the first predetermined value, causing the state of the first queue to change from the second state to the first state.

6. The method of claim 1, further comprising:

based on a determination that the first data has been successfully received by the downstream system and when the first queue is in the second state, analyzing, by the computing system, the number of successful transmission attempts and the number of unsuccessful transmission attempts within a second predetermined window, to determine whether a second trigger event has occurred; and based on a determination that the second trigger event has occurred, changing, by the computing system, the state of the first queue from the second state to the first state.

7. The method of claim 6, wherein determining that the second trigger event has occurred based on the analysis comprises at least one of:

determining that the second trigger event has occurred based on a determination that a number of times that data has been successfully received by the downstream system exceeds a second threshold number within the second predetermined window, wherein the second predetermined window comprises one of a sliding window having a second predetermined time duration or a sliding window having a second predetermined number of attempts;

determining that the second trigger event has occurred based on a determination that a number of consecutive successful transmission attempts equaling the second threshold number has occurred; or determining that a period since the first trigger event occurred exceeds a third predetermined time duration.

8. The method of claim 6, wherein changing the state of the first queue from the first state to the second state comprises changing, by the computing system, the state of the first queue from a blocking state to a non-blocking state, wherein, when the first queue is full and in the blocking state, the blocking state causes second data that is subsequently received by the first queue to wait to enqueue in the first queue until the first queue is no longer full and is able to enqueue the second data, wherein, when the first queue is full and in the non-blocking state, the non-blocking state causes third data that is subsequently received by the first queue to fail to enqueue, resulting in the third data being dropped and a first queue error message being immediately sent to at least a source of the third data.

9. The method of claim 8, wherein changing the state of the first queue from the blocking state to the non-blocking state comprises changing, by the computing system, a configurable time-out setting from a default non-zero-second timeout to a zero-second timeout.

10. The method of claim 8, wherein changing the state of the first queue from the second state to the first state comprises changing, by the computing system, the state of the first queue from the non-blocking state to the blocking state.

11. The method of claim 10, wherein changing the state of the first queue from the non-blocking state to the blocking state comprises changing, by the computing system, a configurable time-out setting from a zero-second timeout to a non-zero-second timeout.

12. The method of claim 6, wherein the computing system comprises a server, wherein changing the state of the first queue from the first state to the second state comprises causing, by the server, a queue state controller to change the state of the first queue from the first state to the second state, and wherein changing the state of the first queue from the second state to the first state comprises causing, by the server, the queue state controller to change the state of the first queue from the second state to the first state.

13. The method of claim 1, wherein changing the state of the first queue from the first state to the second state comprises changing, by the computing system, the state of the first queue from a bounded state to an unbounded state, wherein the bounded state is a set capacity state and, when the first queue is full and in the bounded state, the bounded state causes the first queue to prevent fourth data that is subsequently received by the first queue from enqueuing in the first queue until the first queue is no longer full and is able to enqueue the fourth data, wherein the unbounded state is a state that allows the first queue to expand in capacity and, when the first queue is full and in the unbounded state, the unbounded state causes the first queue to expand in capacity to enqueue fifth data that is subsequently received by the first queue.

14. The method of claim 1, wherein the plurality of data that is stored in the first queue is stored as a plurality of data packets, wherein changing the state of the first queue from the first state to the second state comprises changing, by the computing system, the state of the first queue from a queue having a first packet size capacity to a queue having a second packet size capacity.

15. The method of claim 14, wherein the second packet size capacity dynamically changes based on at least one of how many data packets have been successfully received by the downstream system, how many data packets have not been successfully received by the downstream system, which data packets have been successfully received by the downstream system, or which data packets have not been successfully received by the downstream system.

16. The method of claim 1, wherein determining whether or not the first data has been successfully transmitted to and received by the downstream system comprises one of:

receiving, by the computing system, an acknowledgment ("Ack") message from the downstream system indicating that the first data has been successfully received by the downstream system;

receiving, by the computing system, a negative acknowledgment ("Nack" or "Nak") message from the downstream system indicating that the first data has not been successfully received by the downstream system;

receiving, by the computing system, an error message from the downstream system indicating that the first data has not been successfully received by the downstream system; or determining, by the computing system, that none of an Ack message, a Nack message, or an error message have been received from the downstream system for a period exceeding a predetermined timeout period since the first data was sent from the computing system to the downstream system.

17. The method of claim 1, wherein the first queue is among a plurality of queues that is part of a logging system having a plurality of working threads, wherein the plurality of data comprises a plurality of low priority data.

18. A system, comprising:

a computing system, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

send, to a downstream system, first data among a plurality of data that is stored in a first queue;

determine that the first data has not been successfully transmitted to and received by the downstream system;

determine that the first queue is in a first state;

analyze a number of successful transmission attempts and a number of unsuccessful transmission attempts within a first predetermined window, to determine that a first trigger event has occurred; and change a state of the first queue from the first state to a second state, the first and second states of the first queue defining how data is enqueued by the first queue.

19. The system of claim 18, wherein the computing system comprises at least one of a queuing system, a queue state controller, a server, a cloud computing system, or a distributed computing system.

20. A method, comprising:

sending, by a server and to a downstream system, first data among a plurality of data that is stored in a first queue among a plurality of queues that is part of a logging system having a plurality of working threads, wherein the plurality of data comprises a plurality of low priority data;

determining, by the server, that the first data has been successfully transmitted to and received by the downstream system;

determining, by the server, that the first queue is in a blocking state;

analyzing, by the computing system, a number of successful transmission attempts and a number of unsuccessful transmission attempts within a first predetermined window, to determine that a first trigger event has occurred;

changing, by the server, a state of the first queue from the blocking state to a non-blocking state, wherein, when the first queue is full and in the blocking state, the blocking state causes second data that is subsequently received by the first queue to wait to enqueue in the first queue until the first queue is no longer full and is able to enqueue the second data, wherein, when the first queue is full and in the non-blocking state, the non-blocking state causes third data that is subsequently received by the first queue to fail to enqueue, resulting in the third data being dropped and a first queue error message being immediately sent to at least a source of the third data;

based on a determination that the first data has been successfully received by the downstream system and when the first queue is in the non-blocking state, analyzing, by the computing system, the number of successful transmission attempts and the number of unsuccessful transmission attempts within a second predetermined window, to determine whether a second trigger event has occurred; and based on a determination that the second trigger event has occurred, changing, by the server, the state of the first queue from the non-blocking state to the blocking state.

* * * * *